United States Patent
Maruyama et al.

(10) Patent No.: US 7,849,132 B2
(45) Date of Patent: Dec. 7, 2010

(54) INFORMATION PROCESSOR AND INFORMATION PROCESSING SYSTEM

(75) Inventors: Tatsuya Maruyama, Hitachi (JP); Tsutomu Yamada, Hitachinaka (JP); Hisanori Nonaka, Tokai (JP); Hiromichi Endoh, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 68 days.

(21) Appl. No.: 12/138,614

(22) Filed: Jun. 13, 2008

(65) Prior Publication Data

US 2008/0313326 A1 Dec. 18, 2008

(30) Foreign Application Priority Data

Jun. 15, 2007 (JP) ............................ 2007-159306

(51) Int. Cl.
*G06F 15/16* (2006.01)
*G06F 12/00* (2006.01)

(52) U.S. Cl. ...................................... 709/203; 709/224
(58) Field of Classification Search ......... 709/224–229, 709/238, 245, 250, 203
See application file for complete search history.

(56) References Cited

U.S. PATENT DOCUMENTS

| | | | |
|---|---|---|---|
| 2001/0037402 A1* | 11/2001 | Schneider | 709/236 |
| 2003/0046383 A1* | 3/2003 | Lee et al. | 709/224 |
| 2004/0019895 A1 | 1/2004 | Dubal | |
| 2004/0064760 A1* | 4/2004 | Hicks et al. | 714/43 |
| 2008/0034086 A1* | 2/2008 | Castelli et al. | 709/224 |
| 2008/0154837 A1* | 6/2008 | Morimura et al. | 706/48 |

FOREIGN PATENT DOCUMENTS

| | | |
|---|---|---|
| EP | 0 769 745 | 4/1997 |
| JP | 6-43959 | 2/1994 |
| JP | 7-297878 | 11/1995 |
| JP | 3456599 | 8/2003 |
| JP | 2004-310560 | 11/2004 |
| JP | 2005-182624 | 7/2005 |
| JP | 2007-179119 | 7/2007 |
| JP | 2007-310897 | 11/2007 |

OTHER PUBLICATIONS

Sato et al., The Design and Implementation of a Generic Framework for Remote Device Control, pp. 1-12.
Hirofuchi et al., USB/IP: A Transparent Device Sharing Technology over IP Network, Information and Media Technologies (2006) pp. 639-651.

* cited by examiner

*Primary Examiner*—Zarni Maung
(74) *Attorney, Agent, or Firm*—Antonelli, Terry, Stout & Kraus, LLP.

(57) ABSTRACT

The information processor includes a device communication performance management module. The device communication performance management module includes: a communication performance evaluation unit that measures and evaluates the communication performance with respect to a device to be used when it is used by a device-use application; a device naming rule management unit that manages a naming rule for incorporating the communication performance evaluated by the communication performance evaluation unit into the name of the device file for a device as the target of evaluation; and a device file management unit that creates a device file for a device as the target of evaluation in accordance with the naming rule based on the result of communication performance evaluation. The result of communication performance evaluation by the communication performance evaluation unit is incorporated into the name of a device file and the evaluation result is thereby provided to a device-use application.

7 Claims, 20 Drawing Sheets

FIG. 7

| COMMUNICATION PERFORMANCE | CHARACTER STRING |
|---|---|
| AVERAGE VALUE OF DELAY IS NOT MORE THAN 1ms AND ITS STANDARD DEVIATION IS NOT MORE THAN 50 | hard-real-time |
| AVERAGE VALUE OF BANDWIDTH IS NOT LESS THAN 80Mbps | broadband |
| MINIMUM VALUE OF DELAY IS NOT MORE THAN 100ms AND AVERAGE VALUE OF BANDWIDTH IS NOT LESS THAN 8Mbps | multimedia |

FIG. 8

| NAMING RULE BY COMMUNICATION DELAY ||
|---|---|
| COMMUNICATION PERFORMANCE | CHARACTER STRING |
| AVERAGE VALUE IS NOT MORE THAN 1ms AND STANDARD DEVIATION IS NOT MORE THAN 50 | hard-real-time |
| AVERAGE VALUE IS NOT LESS THAN 10ms | distant |

| NAMING RULE BY BANDWIDTH ||
|---|---|
| COMMUNICATION PERFORMANCE | CHARACTER STRING |
| AVERAGE VALUE IS NOT LESS THAN 8Mbps | broadband |

FIG. 9

| NAMING RULE BY COMMUNICATION DELAY ||
|---|---|
| COMMUNICATION PERFORMANCE | CHARACTER STRING |
| AVERAGE VALUE IS SMALLEST | 1st |
| AVERAGE VALUE IS SECOND SMALLEST | 2st |
| AVERAGE VALUE IS THIRD SMALLEST | 3st |

FIG. 10

/dev/hard-real-time/tty

/dev/broadband/webcamera

/dev/othercase/com1

INFORMATION PROCESSOR AND INFORMATION PROCESSING SYSTEM

CLAIM OF PRIORITY

The present application claims priority from Japanese patent application serial no. 2007-159306, filed on Jun. 15, 2007, the content of which is hereby incorporated by reference into this application.

FIELD OF THE INVENTION

The present invention relates to an information processor capable of using peripheral devices connected with the information processor through a communication channel and an information processing system constructed by connecting such information processors to each other via a communication network.

BACKGROUND OF THE INVENTION

In an information processor which is also called computer or the like, an operating system (hereinafter, referred to as OS) manages data in a storage device by a file system. The file system manages data in a hierarchical structure composed of: files as abstract concepts representing respective sets of data in the storage device handled by the OS; directories (also referred to as folders) for storing pigeonholed and sorted—files; and higher level directories for storing pigeonholed and sorted-directories. In such a file system, a character string indicating the location of each file or directory in a storage device, that is, a character string for specifying a desired file or directory is referred to as "path". The character string of a path is constructed of rows of directories and files in the hierarchical structure. The rows are coupled together by delimiters.

Such an information processor is connected with various peripheral devices, for example, a display, a printer, a scanner, and various actuators. Usually, these devices can work by using device-by-device-use application for device. In this case, devices used by an information processor are classified into local devices and remote devices. The local device is a device directly connected to an information processor, and the remote device is a device connected to another information processor connected through a network.

In general, the use of these devices is carried out in the above-mentioned file system.

That is, with regard to the local devices and remote devices, device-files and directories are created for each device, and these files and directories are managed by a file system similarly with ordinary files and directories for data. The use of each device carried out through a device-use application, in other words, is carried out through a device file managed by a file system.

As the above-mentioned use of a device by an information processor, there are known examples disclosed in, for example, the following Patent Document 1 to Patent Document 4. As the use of a remote device, there is known an example described in the following Non-patent Document 1.

[Patent Document 1] JP-B1-3456599
[Patent Document 2] JP-A-2005-182624
[Patent Document 3] JP-A-2004-310560
[Patent Document 4] JP-A-H6-43959
[Non-patent Document 1] "The Design and Implementation of a Generic Framework for Remote Device Control" in Research Report (February, 2003) of Study Group for System Software and Operating System, in Information Processing Society of Japan, presented by Junji Sato, Eiji Kawai, Yutaka Nakamura, Kazutoshi Fujikawa, and Hideki Sunahara.

In the above-mentioned use of a device in an information processor, usually, a device-use application has restriction of some kind with respect to processing time or the like related to the utilization of the device. For this reason, there is a possibility that the information processor incurs trouble if a device-use application utilizes a device that does not conform to the restriction. However, the fact is that measures sufficient to cope with this have not been conventionally taken.

The invention has been made with the above-mentioned circumstances as a background. An object of the invention is to make it possible to implement the following with respect to an information processor so constructed that it can use a device and an information processing system constructed of such information processors: to easily determine whether or not a device to be used conforms to restriction on the device-use application and to effectively prevent trouble from being incurred by the use of a device.

SUMMARY OF THE INVENTION

To easily determine whether or not a device to be used conforms to restriction on the device-use application, that is, easily make a restriction conformance determination, the following measure is effective: communication performance is evaluated with respect to communication with the device and communication performance information obtained as the result of the evaluation is utilized. Specifically, it is made possible to implement the following: the communication performance of a device to be used is evaluated, and more actual communication performance information is thereby acquired; and based on this communication performance information, it is determined whether or not the device conforms to restriction on the device-use application. This makes it possible to effectively prevent the occurrence of trouble arising from the use of a device. The facilitation of restriction conformance determinations helps software developers to enhance the efficiency of software development. More specific description will be given. It is made possible to acquire communication performance information through communication performance evaluation and make good use of it in restriction conformance determination. This makes it possible to effectively prevent the occurrence of trouble arising from the use of a device and enhance the efficiency of software development.

According to the invention, the above problem associated with information processors is solved based on the above idea. More specific description will be given. An information processor is constructed to be able to use a device connected through a communication channel by a device-use application. This information processor is characterized in that: it includes a communication performance evaluation unit that measures and evaluates the communication performance of the device when the device is used by the device-use application; and the result of communication performance evaluation by the communication performance evaluation unit is provided to the device-use application.

As mentioned above, the use of a device is carried out through a device file created for each device. That is, the use of a device by a device-use application must use a device file and a directory. Therefore, when providing the result of evaluation by the communication performance evaluation unit to a device-use application, it is most suitable to utilize a device file or a directory and, more specifically, to incorporate communication performance in the name of a device file or a directory.

According to the invention, for the foregoing reasons, the above-mentioned information processor includes: a naming rule management unit that manages a naming rule for incorporating the communication performance evaluated by the communication performance evaluation unit into the name of the device file for the device as the target of the communication performance evaluation; and a device file management unit that creates the device file for the device as the target of the communication performance evaluation with a name in accordance with the naming rule based on the result of communication performance evaluation by the communication performance evaluation unit.

According to the invention, further, the above-mentioned information processor is constructed as the naming rule management unit has a naming rule table. The naming rule table is provided with: a communication performance field for recording each communication performance class obtained by grading the communication performance; and a communication performance symbolizing character string field for recording a character string symbolizing each communication performance class recorded in the communication performance field. The communication performance symbolizing character string field is provided in correspondence with the communication performance field. This simplifies the naming rule and makes it possible for the device file management unit to more efficiently create a device file or a directory.

Delay and bandwidth are appropriate as index of communication performance evaluated by the communication performance evaluation unit of the above-mentioned information processor. It is appropriate that communication performance evaluation should be carried out with respect to a plurality of measurement results obtained by repeatedly measuring communication performance. In the above-mentioned information processor of the invention, therefore, delay and bandwidth are evaluated as the foregoing communication performance. Further, the communication performance evaluation is carried out by determining the average, minimum value, maximum value, and standard deviation with respect to a plurality of measurement results obtained by repeatedly measuring the communication performance.

According to the invention, the above information processor includes an anomaly determination unit and an anomaly remedy processing unit. The anomaly determination unit determines whether or not there is any anomaly in the communication performance in communication with the device based on the result of communication performance evaluation by the communication performance evaluation unit. When the anomaly determination unit determines that there is an anomaly in the communication performance, the anomaly remedy processing unit carries out processing for remedying it. This makes it possible to utilize information, obtained from communication performance evaluation by the communication performance evaluation unit, also in the determination of an anomaly in the communication performance of a device. Further, it is possible to automatically take appropriate responses when the presence of an anomaly is determined and to enhance the functionality of the information processor with respect to use of device.

According to the invention, the above-mentioned information processor includes a communication performance management data display unit that provides system users with data related to communication performance evaluation processing by the communication performance evaluation unit by displaying it. This makes it possible for a user of the information processor to easily check the communication performance of a device that can be utilized by the information processor.

According to the invention, the above-mentioned problems associated with an information processing system are solved based on the foregoing idea. More specific description will be given. An information processing system is constructed of that: a client information processor and a server information processor are connected with each other through a communication network; and the client information processor can use a device connected to the server information processor by a device-use application. The information processing system is characterized in that: the client information processor includes a communication performance evaluation unit that measures and evaluates the communication performance of the device when it is utilized by the device-use application; and the result of communication performance evaluation by the communication performance evaluation unit can be provided to the device-use application.

According to the invention, the client information processor of the above-mentioned information processing system includes the following for the same reason as described above with respect to the information processor: a naming rule management unit that manages a naming rule for incorporating the communication performance evaluated by the communication performance evaluation unit into the name of the device file for the device as the target of the communication performance evaluation; and a device file management unit that creates the device file for the device as the target of the communication performance evaluation with a name in accordance with the naming rule based on the result of communication performance evaluation by the communication performance evaluation unit.

According to the invention, the client information processor and the server information processor of the above-mentioned information processing system include time synchronization units for synchronizing respective times with each other. The time synchronization by the time synchronization units can be incorporated into the measurement of communication performance by the communication performance evaluation unit. This makes it possible to bring a client information processor and a server information processor into synchronization with each other. As a result, when the communication performance of a device is evaluated, it is possible to acquire the processing time at each of the client information processor, network, and server information processor. The functionality of the information processors with respect to device unitization can be enhanced by making good use of the resulting processing time information.

According to the invention, the client information processor of the above-mentioned information processing system includes an application migration unit. The application migration unit migrates an application program installed in the client information processor to the server information processor to cause the server information processor to execute the application program. This makes it possible to easily migrate an application program as required.

According to the invention, the client information processor of the above-mentioned information processing system includes an anomaly determination unit. The anomaly determination unit determines whether or not there is any anomaly in the communication performance in communication with the device based on the result of communication performance evaluation by the communication performance evaluation unit. When the anomaly determination unit determines that there is an anomaly in the communication performance, the device-use application corresponding to the relevant device can be migrated to the server information processor by the application migration unit. This makes it possible to take the following action when there is an anomaly in communication performance and thus restriction on the relevant application program cannot be conformed to by execution in the client information processor: the restriction is conformed to by execution in the server information processor. Therefore, it is possible to enhance the flexibility of measures for conforming to the restriction on an application program.

According to the invention, the server information processor of the above-mentioned information processing system includes a notification unit. The notification unit gives a notification that a device connected to the server information processor is available to the client information processor. Thus, each information processor connected to a network can easily determine whether or not a remote device on the network is available.

According to the invention, the client information processor of the above-mentioned information processing system includes a communication switching unit in the following cases: cases where the communication network is formed by providing a high-performance network relatively high in communication performance and a low-performance network relatively low in communication performance so that they can be selectively used. The communication switching unit switches networks for selectively using the high-performance network or the low-performance network. This makes it possible to selectively use a high-performance network or a low-performance network dependent on the restriction on a device-use application for utilizing a device and enhance the optimized utilization of network resources. When either of a high-speed network and a low-speed network is determined to be anomalous or on any other like occasion, the communication switching unit makes it possible to use the other network. Thus, the reliability of the utilization of a device, connected to a server information processor, by a client information processor can be enhanced by redundancy.

According to the above-mentioned invention, the following can be implemented with respect to an information processor constructed to be able to use a device or an information processing system constructed of such information processors: it can be easily determined whether or not a device to be used conforms to restriction on a device-use application; and thus trouble incurred by the use of a device can be effectively prevented.

BRIEF DESCRIPTION OF THE DRAWINGS

FIG. 7 is a drawing illustrating an example of a naming rule table in which delay and bandwidth are combined;

FIG. 8 is a drawing illustrating an example of a naming rule table in which delay and bandwidth are separated from each other;

FIG. 9 is a drawing illustrating an example of a naming rule table based on relative evaluation by the type of device;

FIG. 10 is a drawing illustrating examples of the names of a device file and a directory created by a device file management unit;

DETAILED DESCRIPTION OF THE PREFERRED EMBODIMENTS

Figure 1:
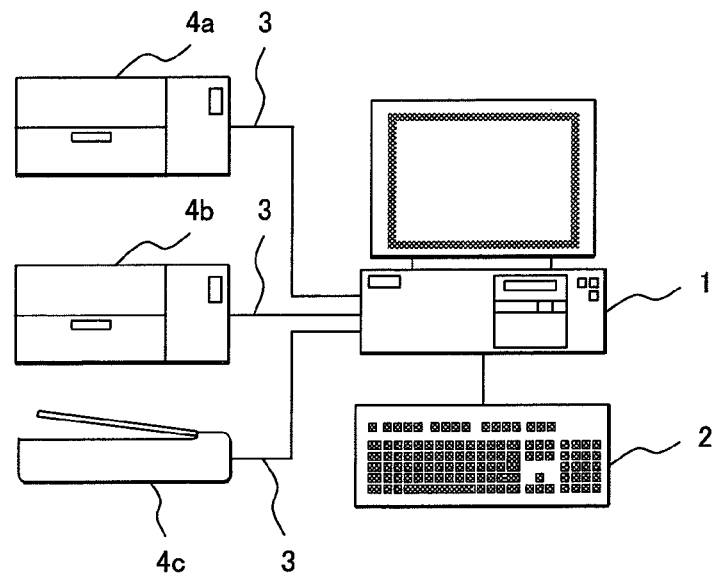
FIG. 1 is a drawing illustrating the configuration of an information processing system to which an information processor in a first embodiment is applied.

Hereinafter, description will be given to embodiments of the present invention. FIG. 1 illustrates an example of the configuration of an information processing system to which an information processor in a first embodiment is applied. The information processing system in this example is constructed of: an information processor 1 that performs information processing; a data input unit 2 that is constructed of, for example, a keyboard, a mouse, a joystick, an operator panel, a touch panel, various sensors, and the like and is used to input data for information processing to the information processor 1; and a plurality of devices 4 (4a, 4b, 4c, . . . ) locally connected with the information processor 1 through each communication channel 3. The devices 4 include devices, such as display, printer, and various actuators, referred to as peripheral devices in relation to the information processor; and devices controlled or operated by the information processor.

The information processor 1 performs predetermined information processing on data inputted from the data input unit 2 and uses any of devices 4 when needing the devices in conjunction with this processing. For this purpose, the information processor 1 has respective device-use applications installed in correspondence with the individual devices 4a, 4b, 4c, . . . . The processor 1 uses a required device-use application for a desired device among the device-use applications 4.

The information processor 1 has a device communication performance management module with respect to the use of those devices 4. The device communication performance management module manages the communication performance in communication with each device 4 when the device is used. Concretely, in a communication system between the information processor 1 and each device 4, device-by-device communication performance information can be acquired, when the device 4 is used on a trial basis or other like, by measuring and evaluating the communication performance of the device. Then, the communication performance information is provided to the device-use application or a software developer in an appropriate manner. One of preferred manners for the providing communication performance information to a device-use application or the like is to utilize a device file name and a directory name. That is, it is a good manner that the communication performance identification related to each device is incorporated into the names of the device file corresponding to the device and the directory for storing it. To incorporate the communication performance identification into such a device file name or a directory name in this case, the following measure is taken: a device file or directory is created with a device file name or a directory name using a character string symbolically representing the communication performance.

The information on the communication performance of the device provided to a device-use application or a software developer as mentioned above is utilized, for example, in determination about restriction on a device-use application with respect to communication. That is, the information is used in restriction conformance determination of whether or not the communication performance in communication with a device used by a device-use application conforms to restriction on the device-use application. This makes it possible to effectively prevent trouble from being incurred in the information processor, for example, by the use of a device that does not conform to restriction on a device-use application. Further, software developers can utilize communication performance information as mentioned above to enhance the efficiency of software development. Furthermore, the communication performance information can also be applied to the effective selection of a device when there is a plurality of devices of the same sort.

Figure 2:
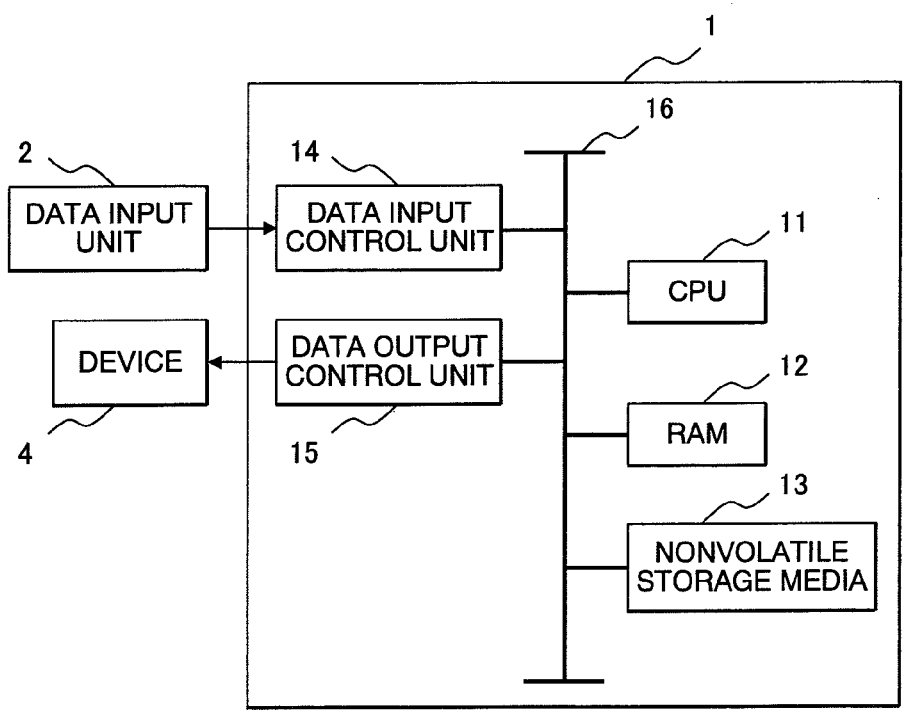
FIG. 2 is a drawing illustrating a common hardware configuration of the information processor in FIG. 1.

FIG. 2 illustrates an example of a common hardware configuration of the information processor 1. The information processor 1 includes CPU 11, RAM 12, nonvolatile storage 13, a data input control unit 14, a data output control unit 15, and a bus 16.

The CPU 11 is a processing unit and is connected to the bus 16. It transfers a required program among the various programs stored on the nonvolatile storage 13 to the RAM 12 and executes it. These programs include OS and application programs, and the application programs include device-use applications for using the devices 4. The RAM 12 is a main internal memory device and functions as a temporary storage means when the CPU 11 carries out processing. That is, it functions to temporarily store program or data which is required to process at the CPU 11, selected among the varied programs and data in the nonvolatile storage 13 and transferred from the nonvolatile storage 13. The nonvolatile storage 13 area storage device and used to store various programs used in processing at the CPU 11, to store the result of processing at the CPU 11, to store information on the operational status of each device 4, and for other like purposes. The data input control unit 14 is connected with the bus 16 and the data input unit 2, and transmits data inputted from the data input unit 2 to the information processor 1. More specific description will be given. When data is inputted from the data input unit 2, the data input control unit 2 asserts an interrupt signal indicating that for the bus 16 and transmits the input data to the CPU 11. The data output control unit 15 is connected with the bus 16 and each device 4, and transmits data outputted from the CPU 11 to the individual devices 4. The bus 16 connects together the CPU 11, RAM 12, nonvolatile storage 13, data input control unit 14, and data output control unit 15. PCI bus, ISA bus, PCI Express bus or the like is used for the bus 16.

Figure 3:
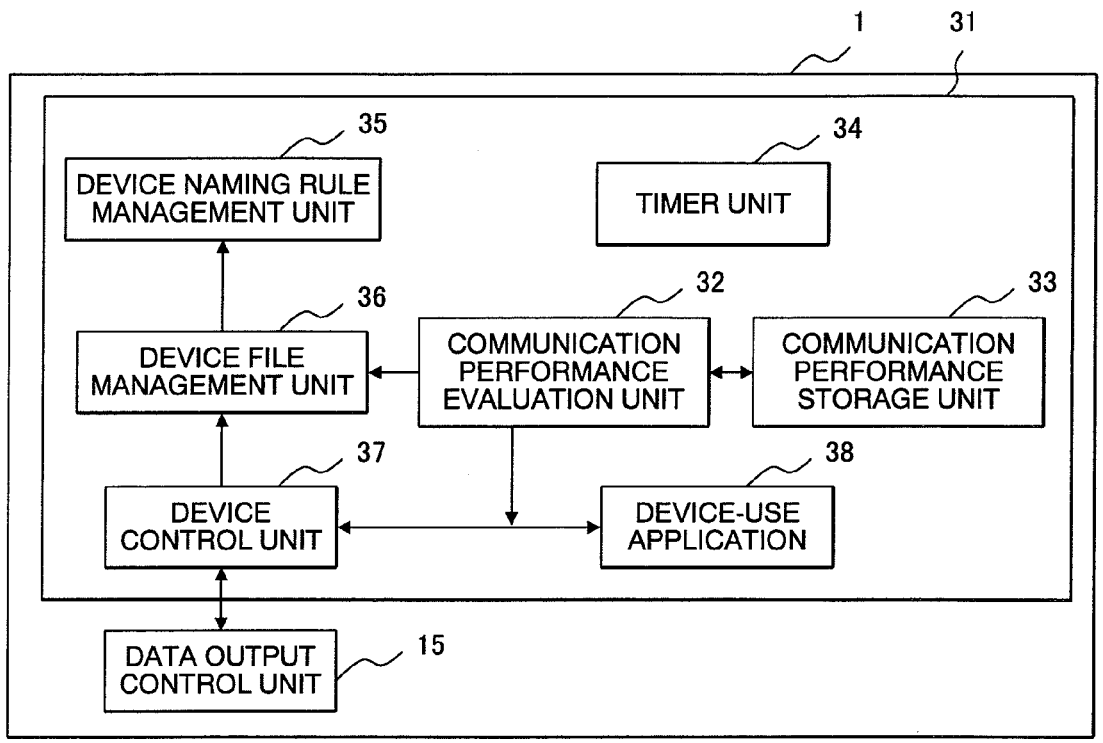
FIG. 3 is a drawing illustrating the functional configuration of the device communication performance management module of the information processor in FIG. 1.

FIG. 3 illustrates the functional configuration of the device communication performance management module mounted in the information processor 1. The device communication performance management module 31 in this example includes: a communication performance evaluation unit 32, a communication performance storage unit 33, a timer unit 34, a device naming rule management unit 35, a device file management unit 36, and a device control unit 37. These operation units are usually constructed by software; however, they may be constructed by hardware.

The communication performance evaluation unit 32 measures and evaluates the communication performance of each device 4 in FIG. 1. The evaluation of communication performance is basically carried out by using a device 4 by a device-use application 38 on a trial basis. That is, the evaluation is basically acquired by using the device 4 with the device-use application 38 on a trial basis and measuring the communication performance at that time. However, the evaluation may be carried out through the routine use of the device 4 as required. Techniques for using a device on a trial basis include initializing the device, outputting test data to the device, inputting test data from the device, and the like. Or, a special operation for testing a device may be defined.

It is desirable that the evaluation of communication performance should be carried out by statistically processing a plurality of measurement results obtained by repeatedly measuring communication performance. Specifically, the evaluation of communication performance is carried out by repeatedly measuring communication performance and determining the average, minimum value, maximum value, standard deviation, or the like with respect to the plurality of measurement results of communication performance. For using a device on a trial basis, the following methods can be used for this repetitive communication performance measurement: measurement is repeatedly carried out at appropriate time intervals; it is carried out beforehand each time a device 4 is actually utilized; and the like. Examples of communication performance indexes evaluated include delay, bandwidth, jitter, and the like. In this embodiment, communication performance evaluation is carried out by delay and bandwidth. The measurement of communication performance and communication performance evaluation based on the measurement results will be described in detail later.

The communication performance storage unit 33 stores information related to the evaluation of communication performance by the communication performance evaluation unit 32.

The timer unit 34 counts time and provides the resulting time information to the communication performance evaluation unit 32. In the drawing, the signal path related to the timer unit 34 is omitted.

The device naming rule management unit 35 manages a naming rule for incorporating the communication performance evaluated by the communication performance evaluation unit 32 into the name of the device file for the device as the target of the evaluation. That is, it manages a naming rule for directory names and device file names into which communication performance is incorporated. As a naming rule, for example, the following method can be used: communication performance is graded on the basis of how easily restriction conformance determination about the above-mentioned restriction on a device-use application can be carried out or on other like basis; and an appropriate character string is determined for the incorporation of communication performance with respect to each communication performance class. Use of the naming rule tables described later as examples is suitable for putting such a naming rule into effect.

The device file management unit 36 creates the device file for a device as the target of evaluation with a name in accordance with a naming rule managed by the device naming rule management unit 35. It creates the device file based on the result of communication performance evaluation by the communication performance evaluation unit 32. Further, the device file management unit can delete an already created device file or directory with communication performance incorporated therein as required. More specific description will be given. With respect to each device 4 that can be used by the information processor 1 in FIG. 1, it creates a device file or a directory with the communication performance of the device incorporated therein. At this time, it creates the device file or directory based on a naming rule managed at the device naming rule management unit 35. Further, the device file management unit deletes an already created device file or directory with communication performance incorporated therein as required. The creation of a device file or a directory by the device file management unit 36 will be described later.

The device control unit 37 is a device driver for devices 4. The device control unit 37 provides a device-use application 38 with a function for the device-use application 38 to utilize the data output control unit 15 when using devices 4. The function provided to the device-use application by the device control unit 37 is, for example, application programming interface or the like. The device-use application 38 is an application program for using a device and has the functions of carrying out the use of the device and acquiring required information from the device.

Figure 4:
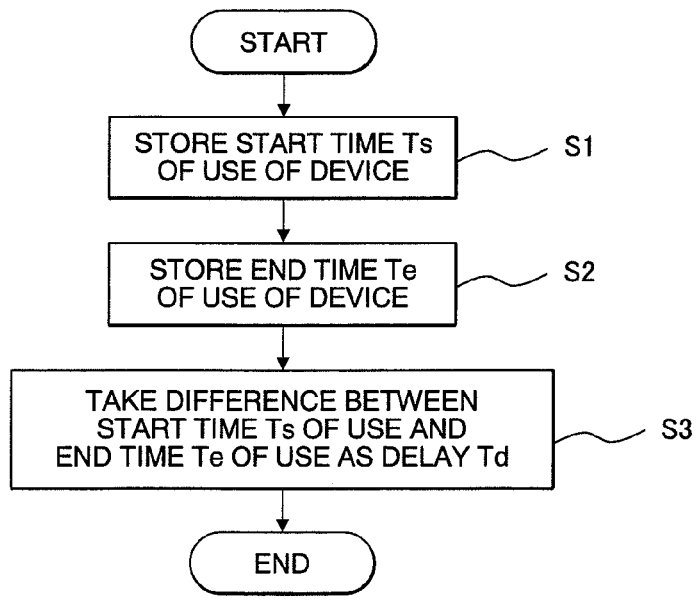
FIG. 4 is a drawing illustrating the flow of processing in delay measurement.

FIG. 4 illustrates the flow of processing in communication delay measurement. First, the communication performance evaluation unit 32 acquires a start time Ts of the use for a device from the timer unit 34 and stores it (Step S1). Subsequently, the communication performance evaluation unit 32 acquires an end time Te of the use for the device from the timer unit 34 and stores it (Step S2). Then, a difference Td between the start time Ts of the use and the end time Te of the use is determined and this difference Td is taken as communication delay (Step S3). The difference Td is equivalent to a time consumed to use the device and in reality it includes the processing time at the device. When the device is used on a trial basis, this processing time is substantially negligible. For this reason, the difference Td is used as effective delay.

Figure 5:
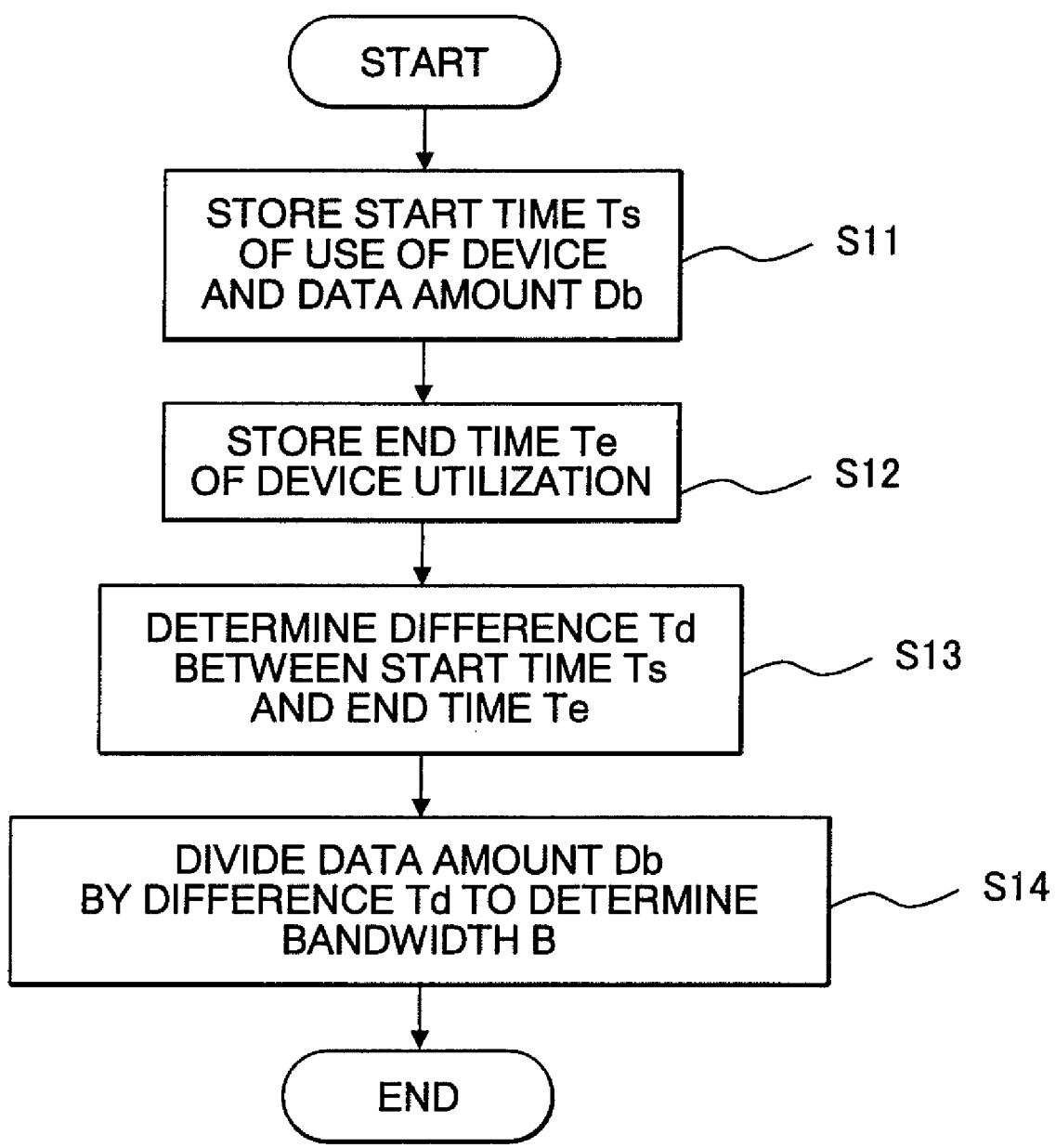
FIG. 5 is a drawing illustrating the flow of processing in bandwidth measurement.

FIG. 5 illustrates the flow of processing in bandwidth measurement. First, the communication performance evaluation unit 32 acquires a start time Ts of the use of a device from the timer unit 34 and stores it. At the same time, it stores the data amount Db of data transmitted to the device in the trial use (Step S11). Subsequently, the communication performance evaluation unit 32 acquires an end time Te of the use of the device from the timer unit 34 (Step S12). Then the difference Td between the start time Ts of the use and the end time Te of the use is determined (Step S13). Last, the data amount Db is divided by Td to determine bandwidth B (Step S14).

Figure 6:
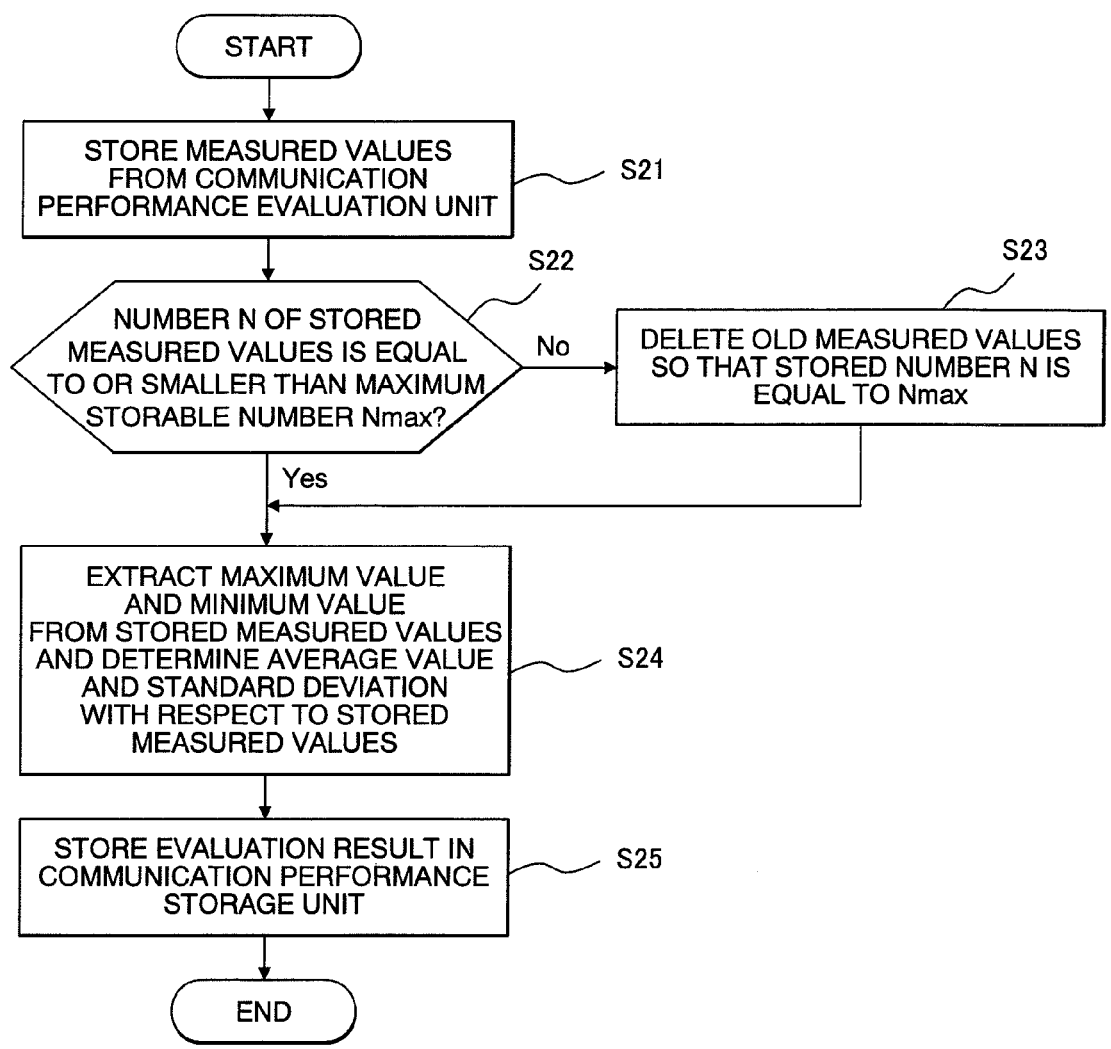
FIG. 6 is a drawing illustrating the flow of processing in communication performance evaluation.

FIG. 6 illustrates the flow of processing in communication performance evaluation. Usually, the evaluation processing is carried out each time the above-mentioned measurement is carried out once. For this reason, the following operation is performed in the evaluation processing. First, the communication performance storage unit 33 stores the measured values of communication delay and bandwidth determined by the communication performance evaluation unit 32 as mentioned above (Step S21). Subsequently, it is determined whether or not the number of measured values stored in the communication performance storage unit 33, namely the number N of stored measured value, is equal to or smaller than a predetermined maximum storable number Nmax (Step S22). When it is determined at Step S22 that N is greater than Nmax, the flow proceeds to Step S23 and one or more old measured values are deleted so that N=Nmax. When it is determined at Step S22 that N is equal to or smaller than Nmax, the flow proceeds to Step S24. At Step S24, the communication performance evaluation unit 32 extracts the maximum value and the minimum value from the N stored measured values and determines the average value and the standard deviation with respect to the N stored measured values. Subsequently, the evaluation result obtained at Step S24 is stored in the communication performance storage unit 33 (Step S25). Evaluation results can be stored, for example, in the tabular form. This is a method in which the following operation is performed: an evaluation result table in which an evaluation result recording field is provided for each device 4 available to the information processor 1 in FIG. 1 is made up; and a result obtained from the evaluation is recorded in these evaluation result recording fields.

The drawings from FIG. 7 to FIG. 9 illustrate an example of a naming rule table used at the device naming rule management unit 35. The naming rule table 39 includes a communication performance field 39a and a communication performance symbolizing character string field 39b in correspondence therewith. In the communication performance field 39a, a communication performance class obtained by appropriately grading the communication performance is recorded. In the communication performance symbolizing character string field 39b, a communication performance symbolizing character string symbolizing the communication performance class in the corresponding communication performance field is recorded. There are several possible formats for such a naming rule table. The naming rule table in FIG. 7 is an example based on grading by a combination of communication delay and bandwidth; the naming rule table in FIG. 8 is an example of a table in which delay and bandwidth are separated from each other; and the naming rule table in FIG. 9 is an example based on relative evaluation by the type of device or by communication performance. These naming rule tables are derived from the differences with various evaluation perspectives; therefore, it is desirable to use them together.

Hereinafter, description will be given to the creation of a device file or a directory with communication performance incorporated therein by the device file management unit 36. There are the following cases in the "creation of a device file or a directory" cited in this specification: cases where a device file or a directory is newly created for a device newly connected to, for example, the information processor; and cases where the name of an existing device file or directory is changed or a copy including a symbolic link or a shortcut is created.

When the evaluation of communication performance is carried out by the communication performance evaluation unit 32 with respect to any of the devices 4 in FIG. 1, the following operation is performed: a corresponding communication performance symbolizing character string is taken out of the device naming rule management unit 35 based on the result of this evaluation. More specific description will be given. A communication performance field in which the communication performance relevant to the evaluation result is recorded is extracted from such a naming rule table as mentioned above in the device naming rule management unit 35. From the communication performance symbolizing character string field corresponding to this communication performance field, a communication performance symbolizing character string recorded therein is taken out. Then, a directory or a device file is created with a device name or a directory name using this communication performance symbolizing character string. The creation of a device file or a directory can be carried out by using a system call provided by OS or API (Application Programming Interface). Examples of such system calls and APIs include the open, creat, and mkdir calls of POSIX and the CreateFile call of the Windows (registered trademark) API. FIG. 10 illustrates examples of the names of a device file and a directory created by the device file management unit 36 as mentioned above.

There can be a plurality of communication performance classes relevant to the result of communication performance evaluation on a device for which a device file is to be created. That is, there can be a plurality of communication performance symbolizing character strings used for a device file to be created. There are several ways to cope with such a case. It is possible to extract only the communication performance symbolizing character string determined to be relevant first. It is possible to extract all of the plurality of relevant communication performance symbolizing character strings. It is possible to select and extract some from among the plurality of relevant communication performance symbolizing character strings. The selective extraction can be carried out by assigning priorities to lined communication performances to be recorded in the communication performance field on a predetermined basis, and selecting and extracting character strings according to the priorities.

Incidentally, there may be cases where no communication performance class corresponds to the result of communication performance evaluation on a device for which a device file is to be created. In these cases, there is no communication performance symbolizing character string for use in the device file to be created. Such a case can be coped with by, for example, the following measures: a name (e.g., other case) indicating that there is no relevant communication performance symbolizing character string is extracted; an acknowledgement dialog is displayed to notify that there is no relevant communication performance symbolizing character string; the fact that there is no relevant communication performance symbolizing character string is stored in the communication performance storage unit 33; and a device file is not created with respect to the result of communication performance evaluation.

Figure 11:
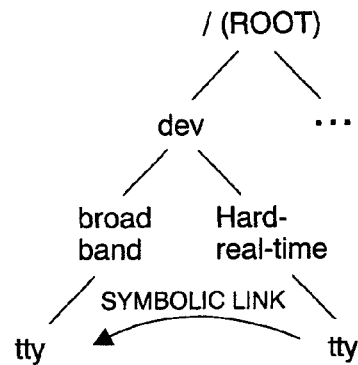
FIG. 11 is a drawing illustrating the hierarchical structure of a directory in one of formats for making a device file.

As mentioned above, the communication performance can be evaluated from various perspectives. For this reason, there can be a plurality of communication performance symbolizing character strings relevant to the result of communication performance evaluation on one device as mentioned above. In such a case, a plurality of device files can be created for one device with different device file names respectively using the plurality of communication performance symbolizing character strings. To cope with such a case, it is appropriate to create a plurality of device files using a symbolic link as illustrated in FIG. 11. Use of a symbolic link makes it possible for a device-use application to operate a device through different paths even when in reality they are one and the same file.

Figure 12:
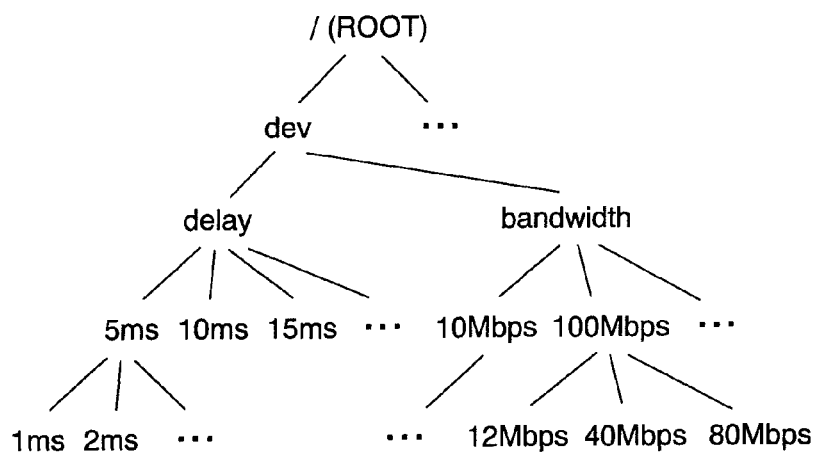
FIG. 12 is a drawing illustrating the hierarchical structure of a directory in another one of formats for making a device file.

FIG. 12 illustrates a format in which device files are created that they are discretized in directories created with respect to each object of evaluation in communication performance evaluation, specifically, by delay and bandwidth, by delay class or bandwidth class. The above-mentioned determination about restriction on a device-use application can be more easily carried out by creating a device file by this format.

Figure 13:
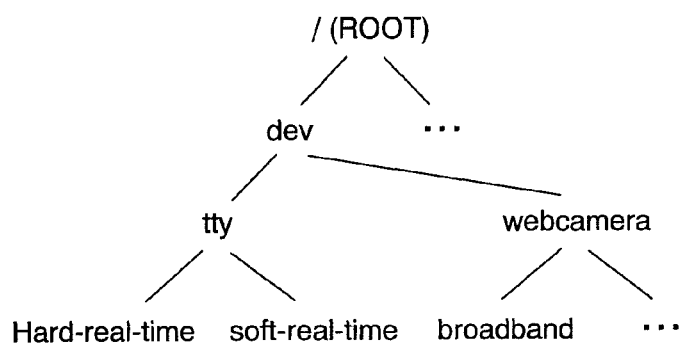
FIG. 13 is a drawing illustrating the hierarchical structure of a directory in a further one of formats for making a device file.

FIG. 13 illustrates a format in which the following is implemented: a directory is created with a name of a device (for example, a name of kind of device) used as its directory name; and under this directory, a device file or a directory is created with the device name or the directory name using a communication performance symbolizing character string extracted from the naming rule table. According to this method, the name of a device is placed first in a path indicating the device file, and thus flexibility is enhanced when a device-use application specifies a device.

Figure 14:
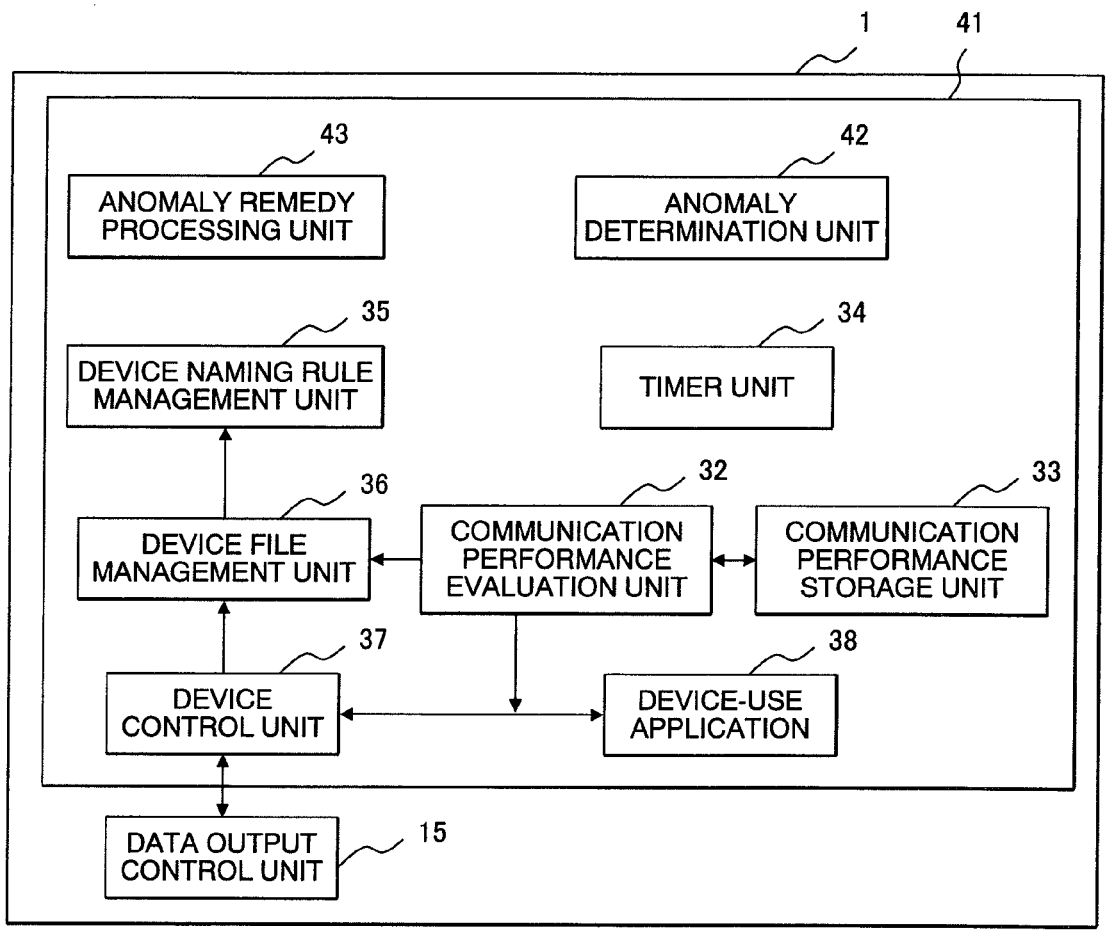
FIG. 14 is a drawing illustrating the functional configuration of a device communication performance management module in a second embodiment.

Hereinafter, description will be given to a second embodiment. This embodiment is characterized in that the information processor 1 in FIG. 1 includes a device communication performance management module 41 constructed as illustrated in FIG. 14. The device communication performance management module 41 includes the same units as the device communication performance management module 31 in FIG. 3 does. That is, it includes the communication performance evaluation unit 32, communication performance storage unit 33, timer unit 34, device naming rule management unit 35, device file management unit 36, and device control unit 37. In addition, the device communication performance management module 41 in this embodiment includes an anomaly determination unit 42 and an anomaly remedy processing unit 43. In FIG. 14, the signal paths related to the timer unit 34, anomaly determination unit 42, and anomaly remedy processing unit 43 are omitted.

The anomaly determination unit 42 determines any anomaly in the communication performance in communication with a device in accordance with a predetermined anomaly determination rule. This determination is carried out based on the result of communication performance evaluation by the communication performance evaluation unit 32. There are the following types of anomaly determination carried out by the anomaly determination unit 42: anomaly determination carried out about the result of communication performance evaluation by the communication performance evaluation unit 32; and anomaly determination carried out about a device file created by the device file management unit 36. However, these types of anomaly determination are basically identical in that they are carried out based on the result of communication performance evaluation.

The anomaly determination about the result of communication performance evaluation can be carried out with respect to, for example, the bandwidth of a communication channel 3 to a device 4 in FIG. 1. More specific description will be given on the assumption that the communication performance evaluation unit 32 measures the bandwidth with respect to, for example, the device 4b. The result of this bandwidth measurement is compared with the original bandwidth of the communication channel 3 to the device 4b. When the result of the bandwidth measurement is smaller than the original bandwidth of the communication channel 3 by an amount equivalent to a value equal to or larger than a predetermined threshold value, the presence of an anomaly is determined. The anomaly determination about the result of communication performance evaluation can be carried out as the comparison of the evaluation results of communication performance evaluation repeatedly carried out. Specifically, the following operation is performed when the communication performance evaluation unit 32 repeatedly carries out communication performance evaluation: the measurement result (delay or bandwidth) of new evaluation processing is compared with the result (the average value of delay or bandwidth) of evaluation in the past; and when the new measurement result is inferior to the past evaluation result by an amount equivalent to a value equal to or larger than a predetermined threshold value, the presence of an anomaly is determined.

In anomaly determination about a device file, the following procedure is taken: when a device is used in accordance with a device file created by the device file management unit 36 and there is no response from the device, the presence of an anomaly is determined. As a result, this anomaly determination about a device file determines the appropriateness of the communication performance, incorporated into the device file created by the device file management unit 36, at the present time. (This appropriateness is also the appropriateness of the device file created by the device file management unit 36 at the present time.)

When the anomaly determination unit 42 determines that there is an anomaly, the anomaly remedy processing unit 43 carries out processing for remedying the anomaly. The anomaly remedy processing unit 43 can carry out, for example, any of the following processing to remedy an anomaly: it deletes a device file and a directory created by the device file management unit 36 based on the result of evaluation by the communication performance evaluation unit 32; it displays an acknowledgement dialog asking the user whether to continue the execution of the device-use application 38; and it stops the execution of the device-use application.

According to the second embodiment mentioned above, it is possible to use communication performance information managed by the device communication performance management module 41 also in communication performance anomaly determination with respect to devices. As a result, the functionality of the device communication performance management module 41 can be enhanced.

Figure 15:
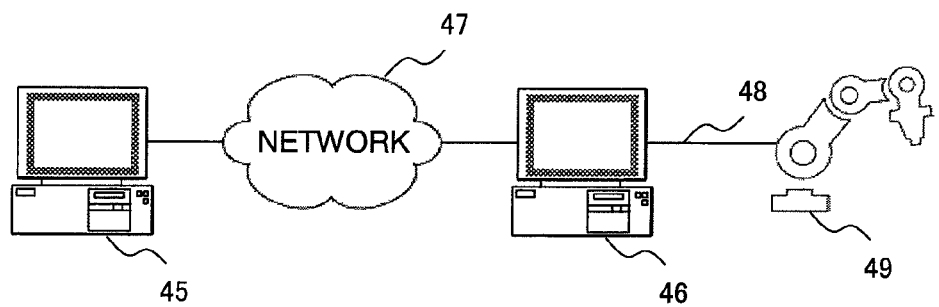
FIG. 15 is a drawing illustrating the functional configuration of an information processing system in a third embodiment.

Hereinafter, description will be given to a third embodiment. FIG. 15 illustrates the configuration of an information processing system in the third embodiment. The information processing system in this embodiment is constructed of that: a client information processor 45 and a server information processor 46 are connected with each other through a network (communication network) 47; and the client information processor 45 can use a device 49 connected to the server information processor 46 through a communication channel 48. The client information processor 45 includes a device communication performance management module that functions to manage communication performance like that in the first embodiment. In FIG. 15, one client information processor 45 and one server information processor 46 are depicted. This is for the simplification of the drawing. In reality a plurality of information processors are connected to the network 47 and each of these information processors functions as a client information processor in some cases and as a server information processor in other cases.

In the information processing system in this embodiment, the use of a device 49 by the client information processor 45 is carried out through the network 47. For this reason, the device 49 is a remote device for the client information processor 45. The device 49 is, for example, an actuator. When the device 49 is such equipment as an actuator, it is usually used by operating or controlling the device 49.

Figure 16:
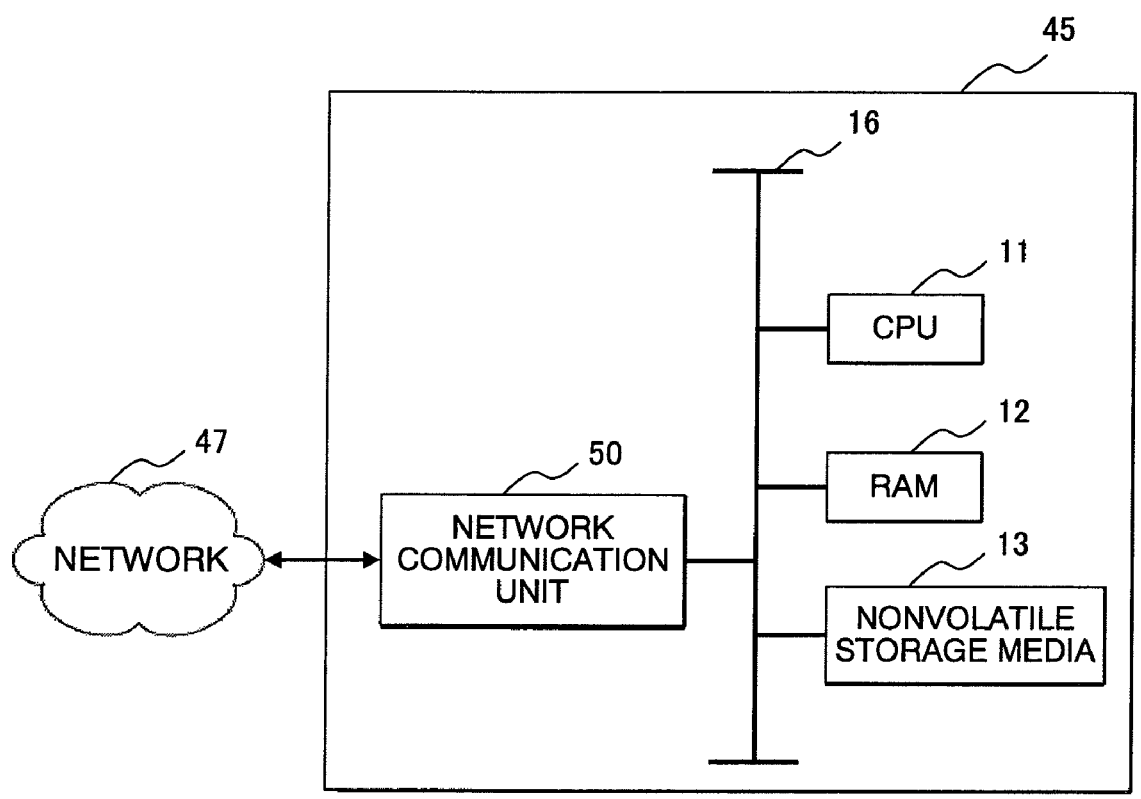
FIG. 16 is a drawing illustrating a common hardware configuration of a client information processor.

FIG. 16 illustrates an example of a common hardware configuration of the client information processor 45. The client information processor 45 includes CPU 11, RAM 12, nonvolatile storage 13, and a bus 16 like the information processor 1 in FIG. 2. In addition, it includes a network communication unit 50 as an element corresponding to the data input control unit 14 and the data output control unit 15 of the information processor 1 in FIG. 2. It utilizes the device 49 connected to the server information processor 46 by communication through the network 47 by the network communication unit 50.

Figure 17:
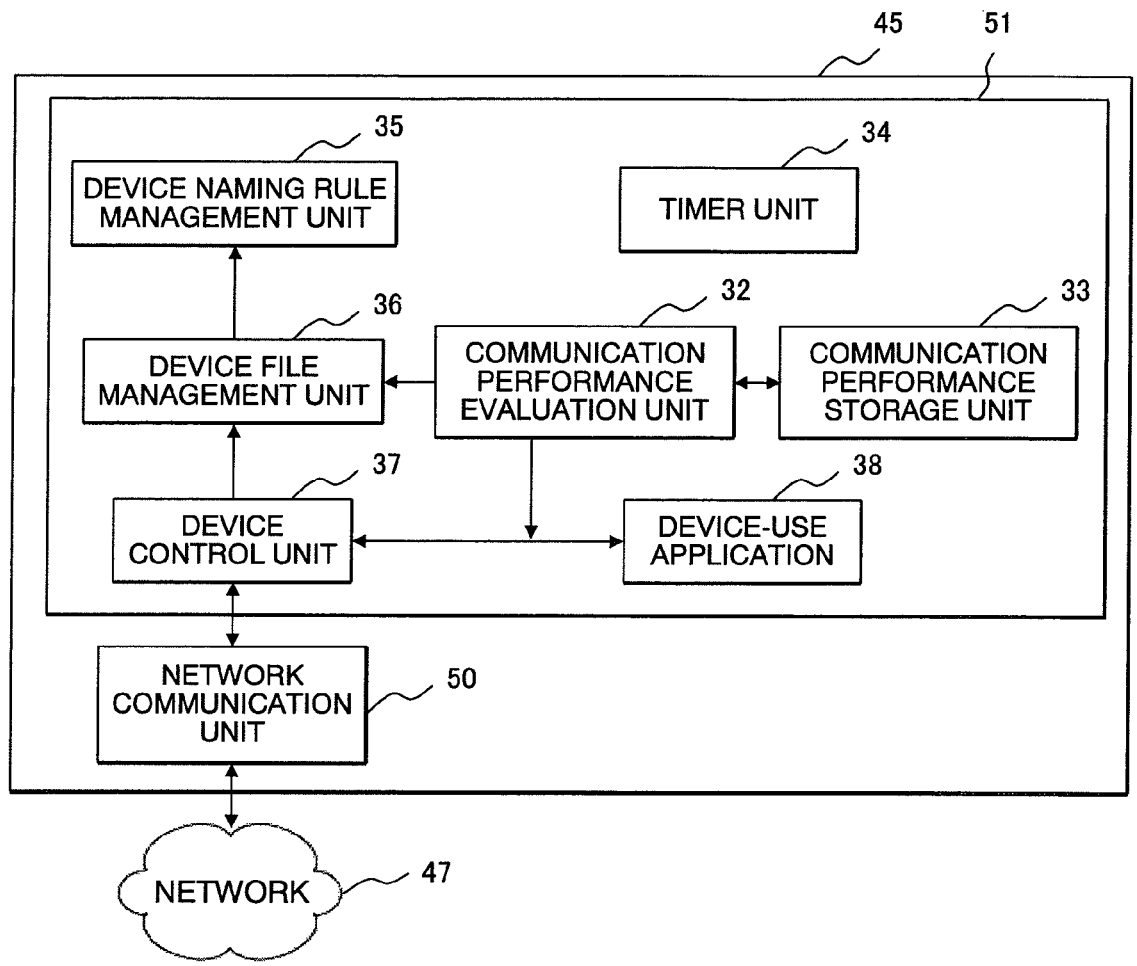
FIG. 17 is a drawing illustrating the functional configuration of the device communication performance management module of a client information processor.

FIG. 17 illustrates the functional configuration of a device communication performance management module 51 mounted in the client information processor 45. The device communication performance management module 51 includes a communication performance evaluation unit 32, a communication performance storage unit 33, a timer unit 34, a device naming rule management unit 35, a device file management unit 36, and a device control unit 37. These functional elements are the same as those of the device communication performance management module 31 in FIG. 3.

In the client information processor 45, as mentioned above, the device-use application 38 uses the device 49 connected to the server information processor 46 through the network 47. For this purpose, the device control unit 37 provides the device-use application 38 with functions for the use of the device 49 through the network 47. Further, it provides the server information processor 46 with a request to use the device 49 from the device-use application 38.

When the client information processor 45 uses the device 49 as mentioned above, the device communication performance management module 51 performs the following operation: it includes the device 49 in the targets of communication performance evaluation, and creates a device file or a directory with the communication performance of the device 49 incorporated based on the result of communication performance evaluation as mentioned above.

The network 47 constitutes a great role of communication carried out when the client information processor 45 uses the device 49. For this reason, the following is one of examples desirable in the measurement of communication performance carried out by the communication performance evaluation unit 32 for the evaluation of the communication performance of the device 49: use of the ping (Packet InterNet Groper) command using ICMP (Internet Control Message Protocol). It is another desirable example to use a dedicated application program designed for the measurement of the performance of communication through a network.

Figure 18:
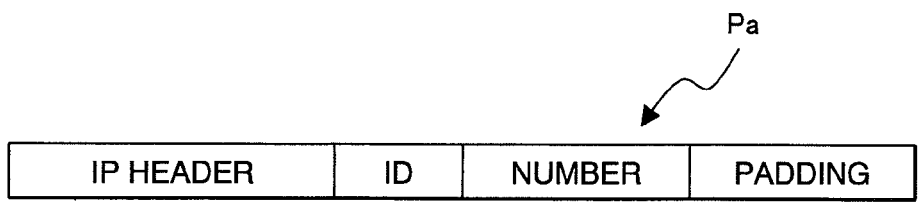
FIG. 18 is a drawing illustrating an example of the format of IP packet.

FIG. 18 illustrates an example of the format of an IP packet transmitted in the trial use of a device when the measurement of communication performance is carried out by a dedicated application. The IP packet Pa in this example contains the data blocks of "IP header," "ID," "Number," and "Padding." The "ID" data block indicates a unique identifier indicating the combination of a device-use application 38 and a device 49. The "Number" data block indicates a unique number different from test IP packet to test IP packet used in trial utilization for communication performance measurement. The "Padding" data block is a data area whose size can be arbitrarily varied for bandwidth measurement.

Figure 19:
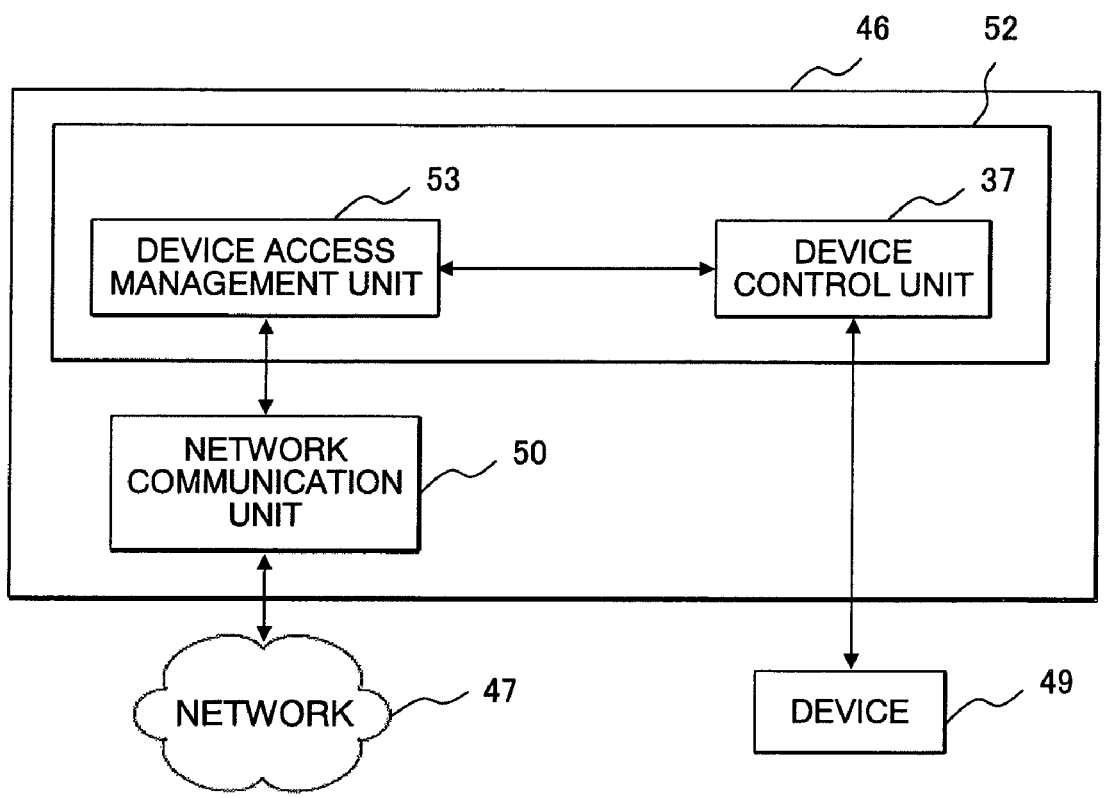
FIG. 19 is a drawing illustrating the functional configuration of the device utilization management module of a server information processor.

A common construction of the server information processor 46 is the same as that of the client information processor 45 and it includes a device utilization management module 52 constructed as illustrated in FIG. 19. The device utilization management module 52 functions to accept the use of the device 49 by the client information processor 45 and includes a device control unit 37 and a device access management unit 53.

The device control unit 37 is the same as that in FIG. 3. The device access management unit 53 honors a request to use the device 49 from the client information processor 45 and executes the utilization of the device 49 (operates or controls the device 49). Further, the device access management unit 53 sends the result of the use of the device 49 back to the device-use application 38 of the client information processor 45.

According to the third embodiment mentioned above, it is possible to provide communication performance information on the device 49 as a remote device to a device-use application or a software developer by the device communication performance management module 51. Therefore, the device-use application and the software developer can easily make determination about restriction on the device-use application also with respect to a remote device.

Figure 20:
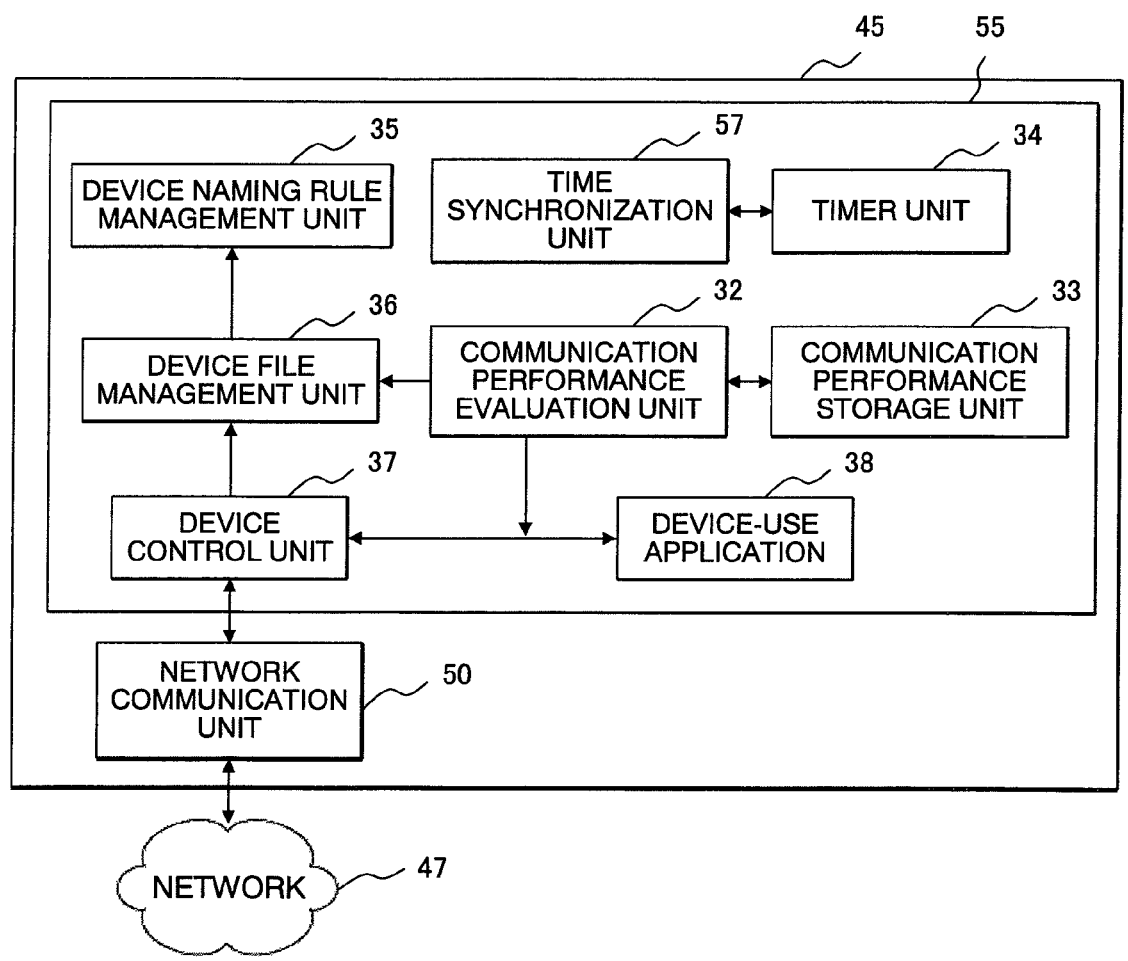
FIG. 20 is a drawing illustrating the functional configuration of the device communication performance management module of a client information processor in a fourth embodiment.
Figure 21:
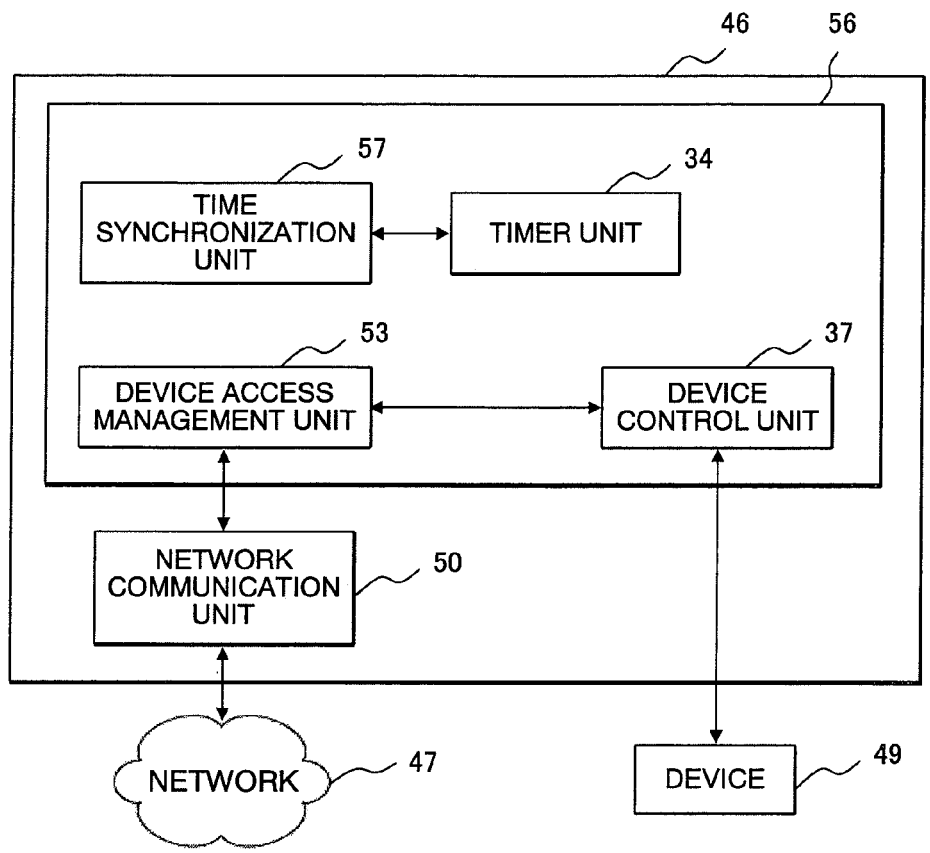
FIG. 21 is a drawing illustrating the functional configuration of the device utilization management module of a server information processor in the fourth embodiment.

Hereinafter, description will be given to a fourth embodiment. This embodiment is characterized in that: the information processing system is constructed like that in FIG. 15; the client information processor 45 in FIG. 15 includes a device communication performance management module 55 constructed as illustrated in FIG. 20; and the server information processor 46 in FIG. 15 includes a device utilization management module 56 constructed as illustrated in FIG. 21.

The device communication performance management module 55 includes the same units as the device communication performance management module 51 in FIG. 17 does. That is, it includes the communication performance evaluation unit 32, communication performance storage unit 33, timer unit 34, device naming rule management unit 35, device file management unit 36, and device control unit 37. In addition, it includes a time synchronization unit 57.

In correspondence with this device communication performance management module 55, the device utilization management module 56 includes the same device control unit 37 and device access management unit 53 as those of the device utilization management module 52 in FIG. 19. In addition, it includes a timer unit 34 and a time synchronization unit 57.

The time synchronization unit 57 synchronizes the time on the client information processor 45 and the time on the server information processor 46 with each other. Then it incorporates the result of this synchronization into time made by the timer unit 34. The time synchronization unit 57 that functions as mentioned above can be constructed using, for example, IEEE1588, NTP (Network Time Protocol), or GPS.

Figure 22:
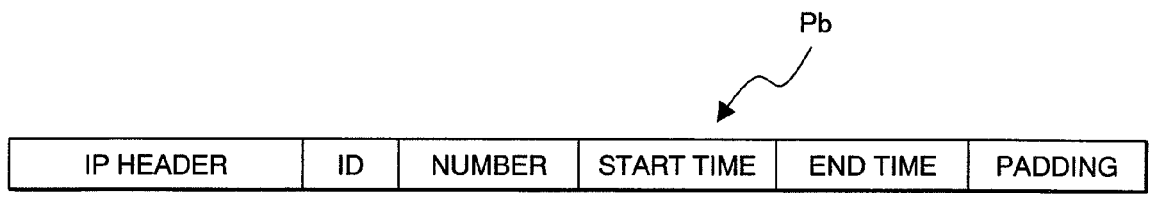
FIG. 22 is a drawing illustrating another example of the format of IP packet.

When it is made possible by the time synchronization unit 57 to synchronize the client information processor 45 and the server information processor 46 with each other as mentioned above, the following takes place: the test IP packet used when the communication performance evaluation unit 32 of the device communication performance management module 55 measures the communication performance with respect to the device 49 by the ping command or a special packet formatted as illustrated in FIG. 22 as an example. Similarly with the IP packet Pa in FIG. 18, the IP packet Pb in this example contains the data blocks of "IP header," "ID," "Number," and "Padding." In addition, it contains the data blocks of "Start Time" and "End Time." The "Start Time" data block indicates the time when the processing of the test IP packet transmitted by the client information processor 45 for communication performance measurement is started at the server information processor 46. It is acquired from the timer unit 34 by the device access management unit 53. The "End Time" data block indicates the time when the processing of the test IP packet is ended at the server information processor 46. It is similarly acquired from the timer unit 34 by the device access management unit 53.

Information about the start time and the end time of the processing of a test IP packet at the server information processor 46 is acquired as mentioned above. Meanwhile, the start time and the end time of the processing of a test IP packet at the client information processor 45 can also be acquired at the client information processor 45. This is done by, for example, the communication performance evaluation unit 32 using the timer unit 34 into which the result of synchronization by the time synchronization unit 57 is incorporated. With respect to test IP packets, therefore, it is possible to obtain the processing time at each of the client information processor 45, network 47, and server information processor 46 and make good utilization of these pieces of processing time data.

One of examples of the utilization of the above-mentioned processing time data is the processing of determining the ratio of the processing time Ts at the server information processor 46 to the processing time Tc at the client information processor 45. This is processing time ratio determination processing in which the ratio of Ts to Tc is determined and it is determined whether or not the result of this determination exceeds a predetermined threshold value. When it is determined in this processing time ratio determination processing that Ts/Tc exceeds the threshold value, the result of the determination is displayed in an acknowledgement dialog to notify the user of the information processing system of it. Or, the result of the determination is stored in the communication performance storage unit 33. Another example of the utilization is the processing in which the following operation is performed: when the result of communication performance measurement carried out at the communication performance evaluation unit 32 is lower than predetermined reference communication performance, Tc and Ts are stored in the communication performance storage unit 33.

According to the fourth embodiment, as mentioned above, the client information processor 45 and the server information processor 46 can be synchronized with each other in the information processing system in FIG. 15. This makes it possible to implement the following in evaluation of the communication performance of the device 49: the processing time at each of the client information processor 45, network 47, and server information processor 46 can be acquired with respect to the test IP packet used in the evaluation. The utilization of these pieces of processing time data makes it possible to carry out processing time ratio determination processing and the like. According to the fourth embodiment mentioned above, the following can be implemented when there is a bottleneck in a series of processing in the utilization of the device 49 by the client information processor 45 through the network 47: it can be identified whether the bottleneck exists in the network 47 or exists in the server information processor 46. The identification of the location of a bottleneck facilitates action for removing the bottleneck. That is, it makes it possible for the developer or the user of the system to enhance the performance of the network 47 or the server information processor 46 with the bottleneck or take other like countermeasures. As a result, it is made easier to conform to restriction on the device-use application 38 with respect to the utilization of the device 49.

Figure 23:
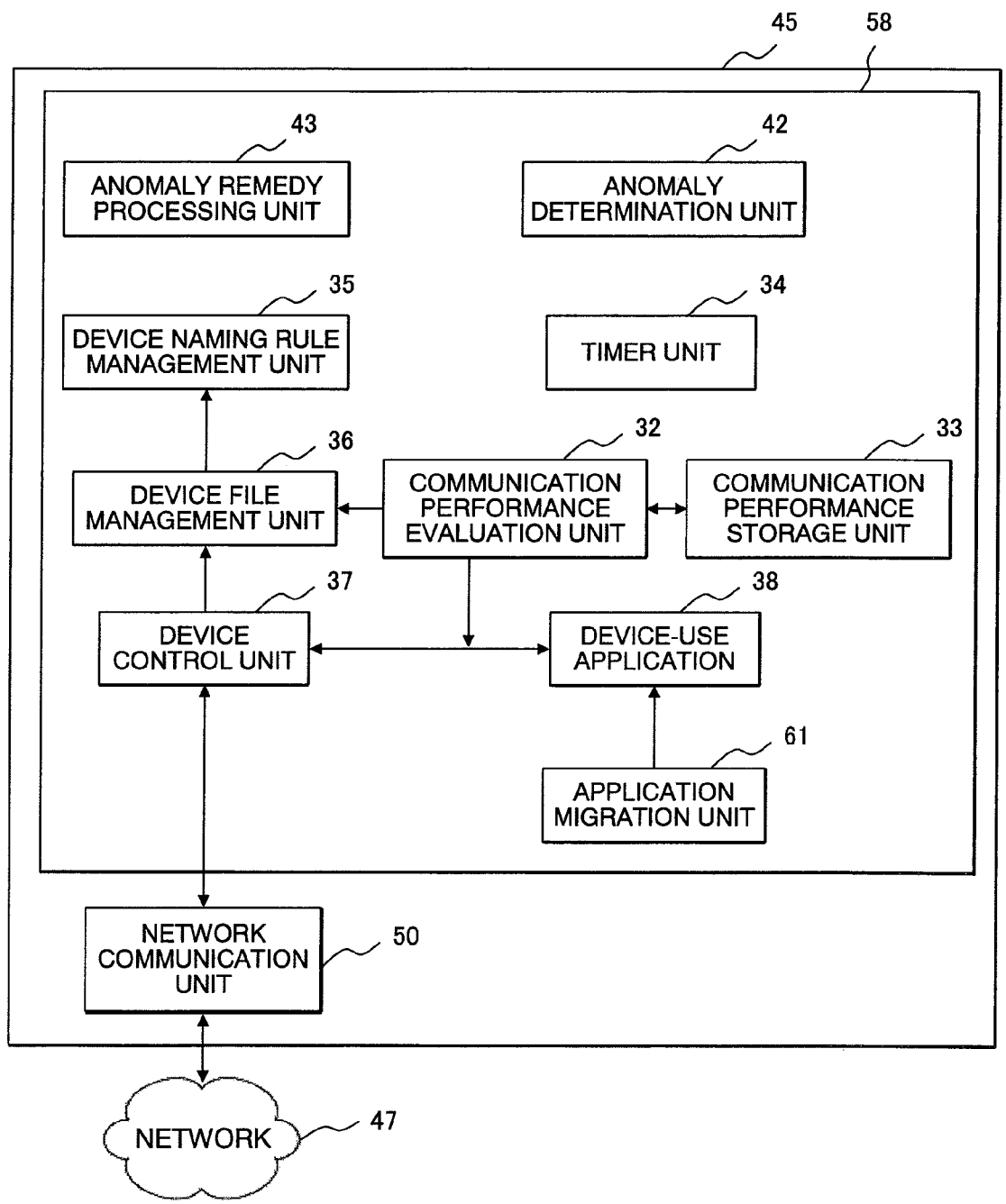
FIG. 23 is a drawing illustrating the functional configuration of the device communication performance management module of a client information processor in a fifth embodiment.
Figure 24:
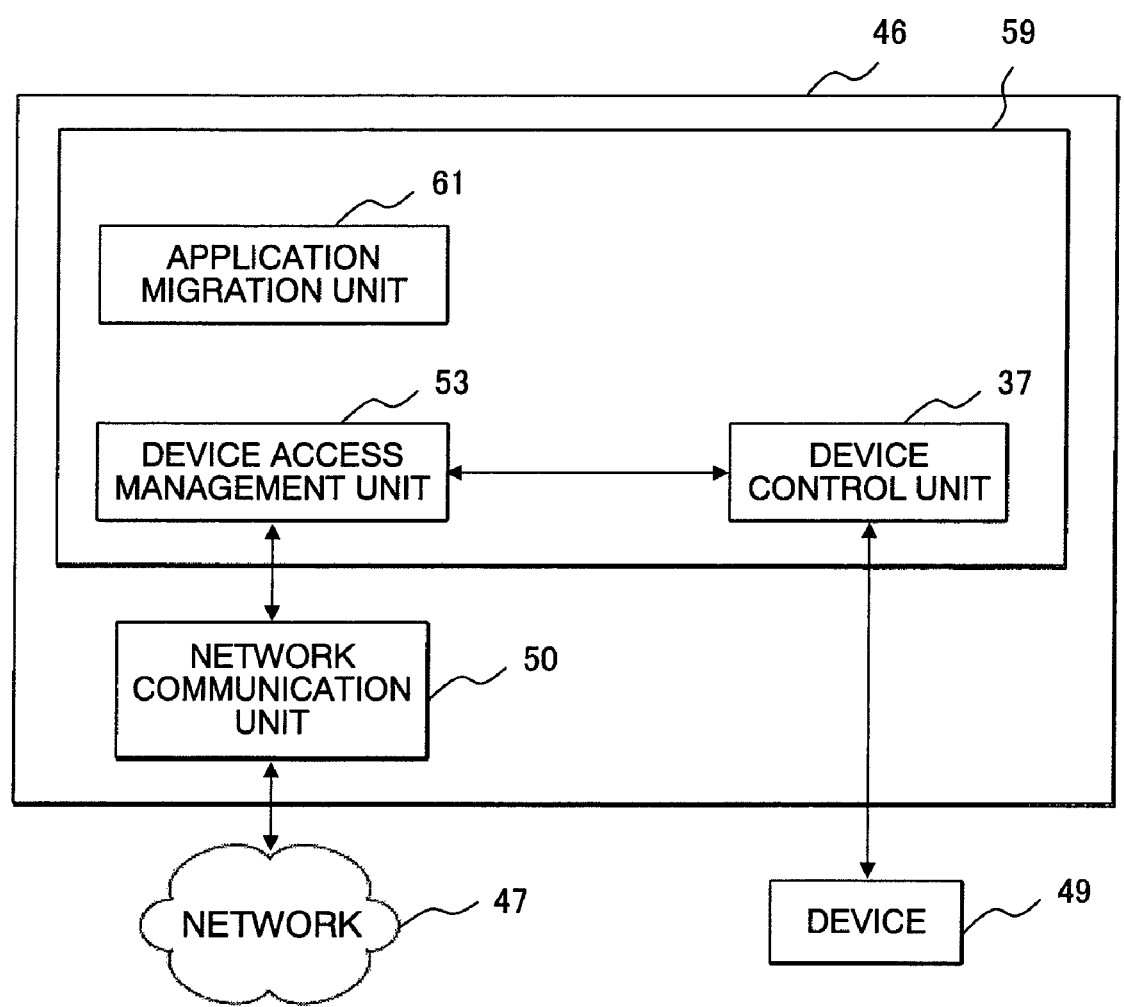
FIG. 24 is a drawing illustrating the functional configuration of the device utilization management module of a server information processor in the fifth embodiment.

Hereinafter, description will be given to a fifth embodiment. This embodiment is characterized in that: the information processing system is constructed as illustrated in FIG. 15; the client information processor 45 in FIG. 15 includes a device communication performance management module 58 constructed as illustrated in FIG. 23; and the server information processor 46 in FIG. 15 includes a device utilization management module 59 constructed as illustrated in FIG. 24.

The device communication performance management module 58 includes the same units as the device communication performance management module 51 in FIG. 17 does. That is, it includes the communication performance evaluation unit 32, communication performance storage unit 33, timer unit 34, device naming rule management unit 35, device file management unit 36, and device control unit 37. In addition, it includes the same anomaly determination unit 42 and anomaly remedy processing unit 43 as in FIG. 14 and further includes an application migration unit 61.

The device utilization management module 59 includes the same device control unit 37 and device access management unit 53 as those of the device utilization management module 52 in FIG. 19 and, in addition, includes an application migration unit 61.

In the client information processor 45, the application migration unit 61 functions as follows to cause the server information processor 46 to execute an application program installed in the client information processor 45: it functions to migrate the application program from the client information processor 45 to the server information processor 46. In the server information processor 46, it functions to receive the application program, migrated from the client information processor 45, and execute it at the server information processor 46. For this application program migration function carried out at the application migration units 61, for example, NFS (Network File System) or FTP (File Transfer Protocol).

In this embodiment, as mentioned above, an application program can be migrated by the application migration units 61. In this embodiment, the anomaly remedy processing unit 43 can carry out the following processing when the anomaly determination unit 42 determines that there is an anomaly in communication performance with respect to, for example, the device 49: it can migrate the device-use application for the device 49 from the client information processor 45 to the server information processor 46 by the application migration unit 61 and causes the program to be executed there.

According to the fifth embodiment mentioned above, the following can be implemented when the restriction on a relevant application program cannot be conformed to by execution at the client information processor 45: the restriction can be conformed to by execution at the server information processor 46. Therefore, flexibility can be enhanced with respect to measures for conforming to the restriction on an application program.

Figure 25:
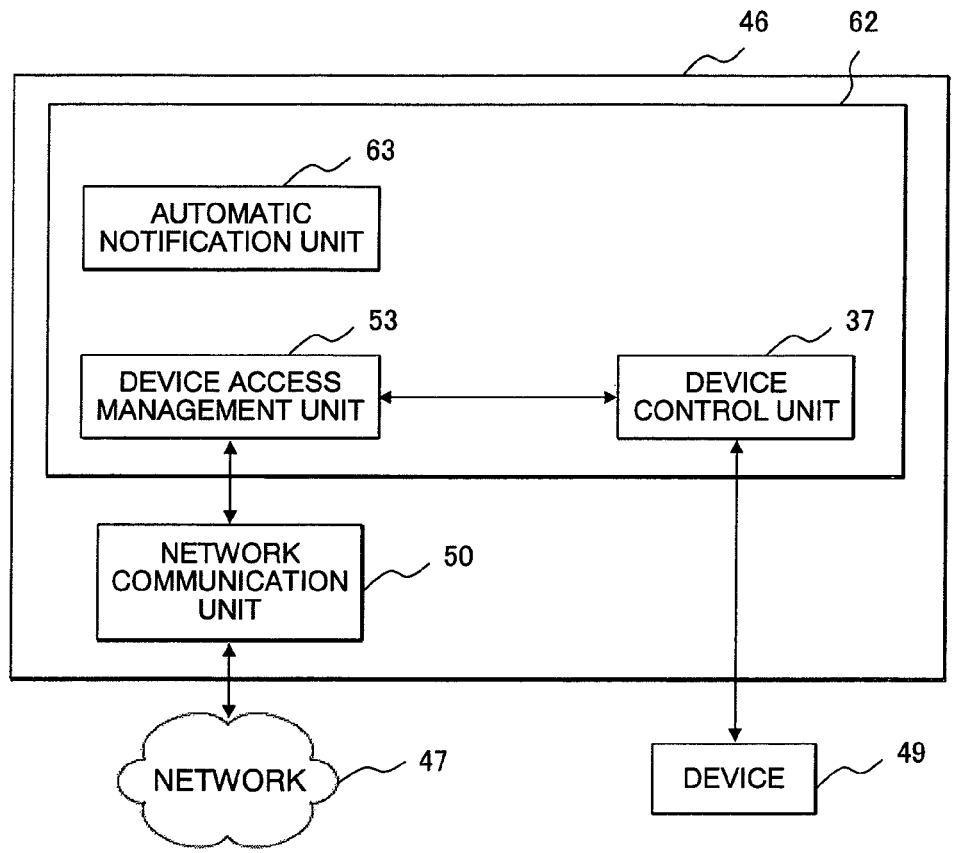
FIG. 25 is a drawing illustrating the functional configuration of the device utilization management module of a server information processor in a sixth embodiment.

Hereinafter, description will be given to a sixth embodiment. This embodiment is characterized in that the information processing system is constructed as that in FIG. 15 and the server information processor 46 in FIG. 15 includes a device-use management module 62 constructed as illustrated in FIG. 25.

The device-use management module 62 includes the same device control unit 37 and device access management unit 53 as those of the device-use management module 52 in FIG. 19 and, in addition, includes an automatic notification unit 63.

The automatic notification unit 63 is constructed using, for example, UPnP or Jini. It functions to notify the client information processor 45 that the device 49 connected to the server information processor 46 is available to the client information processor 45. The function of the automatic notification unit 63 can be generalized as follows. That is, an information processor connected to a device, which is connected to one of a plurality of information processors connected together through a network, notifies another information processor that the device is available to the other information processor.

According to the sixth embodiment mentioned above, each information processor connected to a network can easily determine the availability of a remote device on the network.

Hereinafter, description will be given to a seventh embodiment and an eighth embodiment. These embodiments are modifications to the information processing system in FIG. 15. In an information processing system in these embodiments, a network is formed by providing a high-performance network relatively high in communication performance and a low-performance network relatively low in communication performance so that they can be selectively used. In this information processing system, the client information processor 45 includes a communication switching unit for switching networks for selectively using the high-performance network or the low-performance network.

Figure 26:
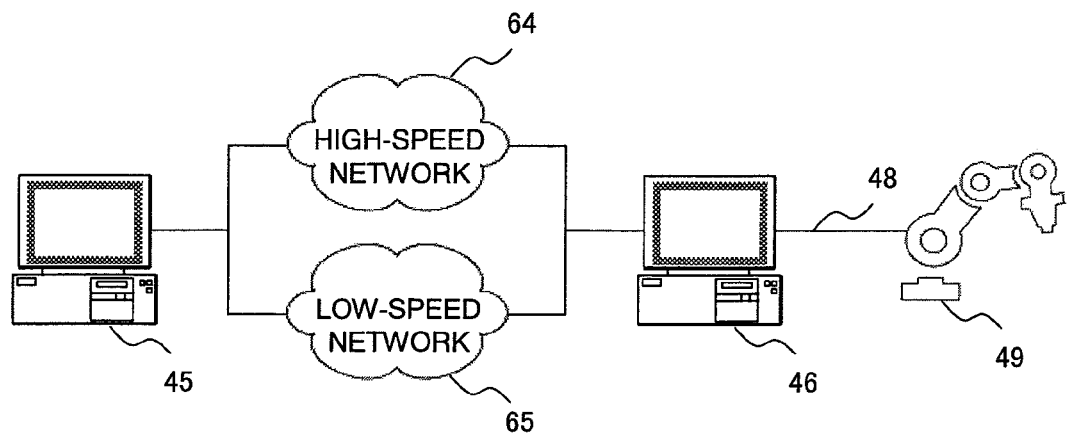
FIG. 26 is a drawing illustrating the functional configuration of an information processing system in a seventh embodiment.

First, description will be given to the seventh embodiment. FIG. 26 illustrates the configuration of an information processing system in the seventh embodiment. The information processing system in this embodiment is basically identical with the information processing system in FIG. 15. It is different in that: a high-speed network (high-performance network) 64 and a low-speed network (low-performance network) 65 are placed so that they can be selectively used to connect the client information processor 45 and the server information processor 46.

The high-speed network 64 is low in delay than the low-speed network 65 and higher in communication performance in that. When the client information processor 45 utilizes the device 49 connected to the server information processor 46, the high-speed network 64 or the low-speed network 65 is selectively used. This selection is made dependent on the restriction on the device-use application 38 with respect to the utilization of the device 49.

Figure 27:
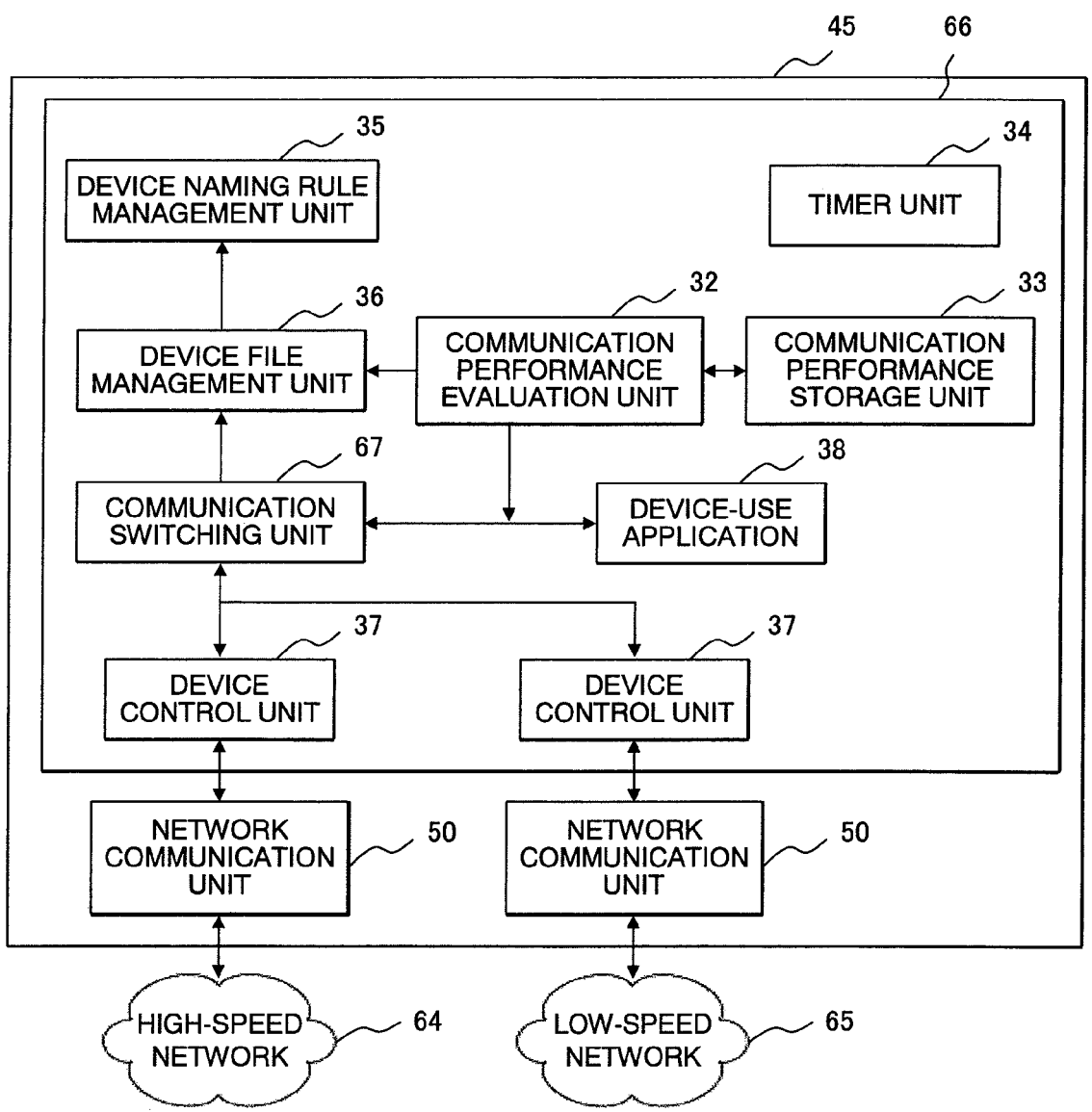
FIG. 27 is a drawing illustrating the functional configuration of the device communication performance management module of a client information processor in the seventh embodiment.

FIG. 27 illustrates the functional configuration of a device communication performance management module 66 mounted in the client information processor 45. The device communication performance management module 66 includes the same units as those of the device communication performance management module 51 in FIG. 17. That is, it includes the communication performance evaluation unit 32, communication performance storage unit 33, timer unit 34, device naming rule management unit 35, device file management unit 36, and device control units 37 (device control unit 37a, device control unit 37b). In addition, it includes a communication switching unit 67.

The communication switching unit 67 switches networks when the high-speed network 64 or the low-speed network 65 is selectively used as mentioned above.

When the client information processor 45 utilizes the device 49, the selection of the high-speed network 64 or the low-speed network 65 is made as mentioned above. That is, the selection is made dependent on the restriction on the device-use application 38 with respect to the utilization of the device 49. To make it possible to effectively select and use a network at this time, communication performance information is required with respect both to the high-speed network 64 and to the low-speed network 65. That is, communication performance information is required with respect to both the networks to be selectively used. For this purpose, the following measure is taken: the device file management unit 36 evaluates the communication performance with respect to the device 49 both when the high-speed network 64 is used and when the low-speed network 65 is used; and it creates a device file or a directory based on the result of each evaluation with respect to each evaluation result.

According to the seventh embodiment mentioned above, the following can be implemented when the client information processor 45 utilizes the device 49 connected to the server information processor 46: the high-speed network 64 or the low-speed network 65 can be more effectively selected and used and thus the optimization of the utilization of network resources can be enhanced. According to the seventh embodiment mentioned above, further, the following can be implemented when trouble occurs in either the high-speed network 64 or the low-speed network 65: the other sound network can be used through the communication switching unit 67. As a result, it is possible to enhance the reliability by redundancy with respect to the utilization of the device 49 connected to the server information processor 46 by the client information processor 45.

Figure 28:
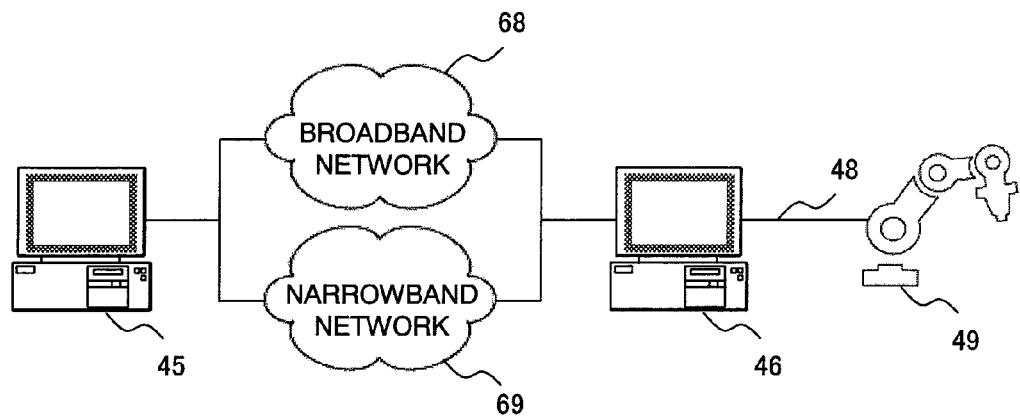
FIG. 28 is a drawing illustrating the functional configuration of an information processing system in an eighth embodiment.

Next, description will be given to the eighth embodiment. FIG. 28 illustrates the configuration of an information processing system in the eighth embodiment. The information processing system in this embodiment is basically identical with the information processing system in FIG. 26. It is different in that: a broadband network 68 and a narrowband network 69 can be selectively used in place of the high-speed network 64 and the low-speed network 65 in FIG. 26; and they are involved in the connection between the client information processor 45 and the server information processor 46.

The broadband network 68 is wider in bandwidth than the narrowband network 69 and higher in communication performance in that. Except for this point, the information processing system in this embodiment is identical with that in the seventh embodiment. Therefore, the foregoing description applies and the concrete description of the information processing system in this embodiment will be omitted.

Figure 29:
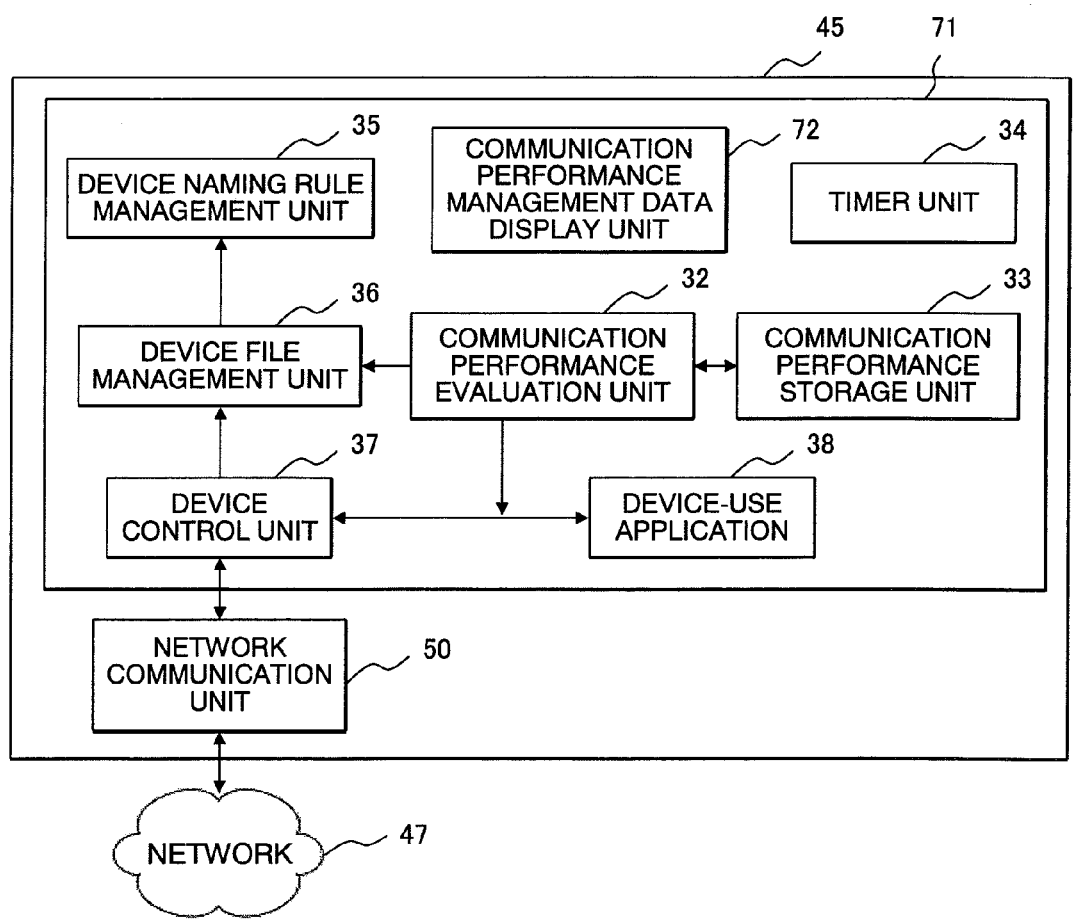
FIG. 29 is a drawing illustrating the functional configuration of the device communication performance management module of a client information processor in a ninth embodiment.

Hereafter, description will be given to a ninth embodiment. This embodiment is characterized in that: the information processing system is constructed as that in FIG. 15 and the client information processor 45 in FIG. 15 includes a device communication performance management module 71 constructed as illustrated in FIG. 29.

The device communication performance management module 71 includes the same units as those of the device communication performance management module 51 in FIG. 17. That is, it includes the communication performance evaluation unit 32, communication performance storage unit 33, timer unit 34, device naming rule management unit 35, device file management unit 36, and device control unit 37. In addition, it includes a communication performance management data display unit 72.

Figure 30:
FIG. 30 is a drawing illustrating an example of a tabulated list of communication performance management data.

The communication performance management data display unit 72 is constructed of, for example, a graphic application. It provides a user of the information processing system with varied data pertaining to device file management carried out by the device communication performance management module 71, that is, varied data pertaining to communication performance evaluation processing carried out by the communication performance evaluation unit 32. This is done by graphically indicating the data on a display or the like. The indication of device file management data on a display or the like by the communication performance management data display unit 72 is carried out using, for example, the tabulated list 73 of communication performance management data illustrated in FIG. 30.

According to the ninth embodiment mentioned above, a user of the information processing system can easily check the communication performance of a device available on the information processing system.

Up to this point, description has been given to embodiments of the invention. These embodiments are just representative examples, and the invention can be embodied in various modes without departing from its subject matter.

What is claimed is:

1. An information processing system configured so that a client information processor and a server information processor are connected with each other through a communication network, a device to be controlled and operated is connected to the server information processor, and the device is not only controllable and operatable by the server information processor but also controllable and operatable as a remote device through the communication network by the client information processor by a device-use application that works in the client information processor, wherein the client information processor comprises a device communication performance management module that measures and evaluates communication performance of the client information processor with respect to the device controlled and operated as the remote device under restriction of the device-use application, and incorporates the result of communication performance evaluation into the name of the device file which is prepared in client information for use by the device-use application.

2. The information processing system according to claim 1, wherein the device communication performance management module of the client information processor includes:

a communication performance evaluation unit measuring and evaluating the communication performance of the client information processor with respect to the device as the remote device under restriction of the device-use application;

a naming rule management unit managing a naming rule for incorporating the communication performance evaluated by the communication performance evaluation unit into the name of the device file for the device as a target of the communication performance evaluation; and a device file management unit creating the device file for the device as the target of the communication performance evaluation with a name in correspondence with the naming rule based on the result of communication performance evaluation by the communication performance evaluation unit.

3. The information processing system according to claim 1, wherein the client information processor and the server information processor respectively include a time synchronization unit for synchronizing times thereon with each other, and the result of time synchronization by the time synchronization unit is incorporated into communication performance measurement by the communication performance evaluation unit.

4. The information processing system according to claim 1, wherein the client information processor includes an application migration unit migrating an application program installed in the client information processor to the server information processor to cause the application program to be executed at the server information processor.

5. The information processing system according to claim 4, wherein the client information processor includes an anomaly determination unit determining whether or not any anomaly exists with respect to the communication performance in communication with the device based on the result of communication performance evaluation by the communication performance evaluation unit, and when the anomaly determination unit determines that an anomaly exists in communication performance, migrates a device-use application corresponding to the relevant device to the server information processor by the application migration unit.

6. The information processing system according to claim 1, wherein the server information processor includes a notification unit notifying that a device connected to the server information processor can be utilized by the client information processor.

7. The information processing system according to claim 1, wherein the communication network is formed by providing a high-performance network relatively high in communication performance and a low-performance network relatively low in communication performance, so that the networks can be selectively used, and the client information processor includes a communication switching unit switching networks for selectively using the high-performance network or the low-performance network.

* * * * *